(12) United States Patent
Ginestra et al.

(10) Patent No.: US 11,021,666 B2
(45) Date of Patent: Jun. 1, 2021

(54) METHODS OF PROVIDING HIGHER QUALITY LIQUID KEROSENE BASED-PROPULSION FUELS

(71) Applicant: SHELL OIL COMPANY, Houston, TX (US)

(72) Inventors: Cynthia Natalie Ginestra, Houston, TX (US); Brice Nathaniel Dally, Madison, WI (US); Joanna Margaret Bauldreay, Manchester (GB); Gregory Hemighaus, Richmond, CA (US)

(73) Assignee: SHELL OIL COMPANY, Houston, TX (US)

( * ) Notice: Subject to any disclaimer, the term of this patent is extended or adjusted under 35 U.S.C. 154(b) by 849 days.

(21) Appl. No.: 15/386,023

(22) Filed: Dec. 21, 2016

(65) Prior Publication Data

US 2017/0175019 A1    Jun. 22, 2017

Related U.S. Application Data

(60) Provisional application No. 62/270,181, filed on Dec. 21, 2015.

(51) Int. Cl.
*C10L 1/04* (2006.01)
*F02C 3/24* (2006.01)
*F02K 7/00* (2006.01)

(52) U.S. Cl.
CPC .................. *C10L 1/04* (2013.01); *F02C 3/24* (2013.01); *F02K 7/00* (2013.01);
(Continued)

(58) Field of Classification Search
CPC .. C10L 1/04; C10L 2200/043; C10L 2270/04; C10L 2290/24; F02C 3/24; F02K 7/00; F05D 2220/323
See application file for complete search history.

(56) References Cited

U.S. PATENT DOCUMENTS 3,522,169 A    7/1970   Ireland
3,702,886 A    11/1972  Arganer et al.
(Continued)

FOREIGN PATENT DOCUMENTS

RU       2341554 C2     12/2008
WO    2004050804 A1      6/2004
(Continued)

OTHER PUBLICATIONS

Properties of Kerosene www.waterrocket.explorer.free.fr/properties_of_kerosene ; Date unknown (Year: 0000).*

(Continued)

*Primary Examiner* — Cephia D Toomer
(74) *Attorney, Agent, or Firm* — Shell Oil Company (57) ABSTRACT

By blending a quantity of synthetic cyclo-paraffinic kerosene fuel blending component comprising at least 99.5 mass % of carbon and hydrogen content and at least 50 mass % of cyclo-paraffin into kerosene base fuel, kerosene based-propulsion fuels can be upgraded to higher quality kerosene based-propulsion fuels such as jet fuel or rocket fuel to meet certain specification and/or increase volumetric energy content of the propulsion fuel.

23 Claims, 2 Drawing Sheets

(52) U.S. Cl.
CPC ..... *C10L 2200/043* (2013.01); *C10L 2270/04* (2013.01); *C10L 2290/24* (2013.01); *F05D 2220/323* (2013.01)

(56) References Cited

U.S. PATENT DOCUMENTS

| | | | |
|---|---|---|---|
| 3,709,979 | A | 1/1973 | Chu |
| 3,832,449 | A | 8/1974 | Rosinski et al. |
| 4,016,245 | A | 4/1977 | Plank |
| 4,076,842 | A | 2/1978 | Plank et al. |
| 4,100,262 | A | 7/1978 | Pelrine |
| 4,107,195 | A | 8/1978 | Rollmann |
| 4,139,600 | A | 2/1979 | Rollmann et al. |
| 4,375,573 | A | 3/1983 | Young |
| 4,470,851 | A | 9/1984 | Paszner et al. |
| 5,019,663 | A | 5/1991 | Chou et al. |
| 7,022,888 | B2 | 4/2006 | Choudhary et al. |
| 7,685,807 | B2 | 3/2010 | Watkins et al. |
| 7,827,781 | B2 | 11/2010 | Bendel |
| 7,977,517 | B2 | 7/2011 | Cortright et al. |
| 8,017,818 | B2 | 9/2011 | Cortright et al. |
| 8,053,615 | B2 | 11/2011 | Cortright et al. |
| 8,466,330 | B2 | 6/2013 | Bauldreay et al. |
| 8,506,656 | B1 | 8/2013 | Turocy |
| 8,642,813 | B2 | 2/2014 | Qiao et al. |
| 9,206,366 | B2 | 12/2015 | Bauldreay et al. |
| 2005/0023188 | A1 | 2/2005 | Connor |
| 2009/0255172 | A1* | 10/2009 | Choo ............... C10L 1/02 44/388 |
| 2010/0270205 | A1 | 10/2010 | Lopez et al. |
| 2011/0005190 | A1* | 1/2011 | Bauldreay ............. C10L 1/04 60/39.461 |
| 2012/0198760 | A1 | 8/2012 | Blommel et al. |
| 2012/0211399 | A1 | 8/2012 | Cannella et al. |
| 2013/0036660 | A1 | 2/2013 | Woods et al. |
| 2013/0102817 | A1 | 4/2013 | Dahlstrom et al. |
| 2013/0253237 | A1 | 9/2013 | Mathur |
| 2013/0263498 | A1 | 10/2013 | Kania et al. |

FOREIGN PATENT DOCUMENTS

| | | |
|---|---|---|
| WO | 2011017720 A1 | 2/2011 |
| WO | 2016179133 A1 | 11/2016 |

OTHER PUBLICATIONS

International Search Report and Written Opinion received for PCT Patent Application No. PCT/US2016/067901, dated Mar. 3, 2017, 9 pages.

International Search Report and Written Opinion received for PCT Patent Application No. PCT/US2016/067904, dated Mar. 3, 2017, 9 pages.

International Search Report and Written Opinion received for PCT Patent Application No. PCT/US2016/067902, dated Mar. 3, 2017, 8 pages.

Muurinen, "Organosols Pulping: A Review and Distillation Study Related to Peroxyacid Pulping", ISBN 951-42-5661-1, vol. 146 of Acta Universitatis Ouluensis. Series C, Technica, ISSN 0355-3213, 314 pages.

Bozell et al., "New Quinone-based Pulping Catalysts", IPST Technical Paper Series No. 741, Tappi Journal, vol. 82, Issue No. 12, 16 pages.

* cited by examiner

METHODS OF PROVIDING HIGHER QUALITY LIQUID KEROSENE BASED-PROPULSION FUELS

The present application claims the benefit of U.S. Provisional Application Ser. No. 62/270,181, filed 21 Dec. 2015, the entire disclosure of which is hereby incorporated by reference.

FIELD OF THE INVENTION

This invention relates to methods of providing higher quality kerosene-based propulsion fuels. More specifically, the invention relates to methods of upgrading kerosene-based propulsion fuels to fuels having enhanced properties using synthetic fuel blending components.

BACKGROUND OF THE INVENTION

Typical jet fuels and liquid kerosene rocket fuels are prepared in a refinery from a crude mineral oil source. Typically the crude mineral oil is separated by means of distillation into a distillate kerosene fraction boiling in the aviation fuel range or a more purified liquid kerosene rocket fuel. If required, these fractions are subjected to hydroprocessing to reduce sulfur, oxygen, and nitrogen levels.

Increasing demand for jet fuel and the environmental impact of aviation related emissions places the aviation industry at the forefront of today's global energy challenge. The increased demand for petroleum-based fuels has resulted in a higher production of greenhouse gases. In particular, the aviation industry accounts for about 2% of global $CO_2$ emissions. The aviation transport sector is growing 3-5% year on year, and due to the projected increasing demand for fuel and increasing production of $CO_2$ emissions, there is a need to explore methods to increase environmentally-friendly fuel sources while meeting jet fuel specifications.

Perhaps more tangible than the global impact of greenhouse gases is the impact of local emissions from aircraft. Emissions near and around airports have a direct impact on the air composition and therefore have been linked with poor local air quality, which can be further linked to impacts on human health. Sooty particulates and oxides of sulfur and nitrogen are considered to be contributors to poor local air quality. Thus, local air quality is seen as an integral element in the pursuit of environment-friendly fuels.

Petroleum-derived jet fuels inherently contain both paraffinic and aromatic hydrocarbons. In general, paraffinic hydrocarbons offer the most desirable combustion cleanliness characteristics for jet fuels. Aromatics generally have the least desirable combustion characteristics for aircraft turbine fuel. In aircraft turbines, certain aromatics, such as naphthalenes, tend to burn with a smokier flames and release a greater proportion of their chemical energy as undesirable thermal radiation than other more saturated hydrocarbons.

The closest current option for reducing aviation emissions is blending synthesized paraffinic kerosene ("SPK") from Fischer-Tropsch or hydrogenated vegetable oil with conventional jet fuel. Up to 50% by volume of SPK is permitted by the alternative jet fuel specification ASTM D7566. If the resulting blend meets the specification, it can be certified and considered equivalent to conventional, petroleum-derived jet fuel. Typically, these synthesized paraffinic kerosenes contain a mixture of normal and branched paraffin according to ASTM D7566.

It is important that novel fuels meet their respective jet fuel specifications without having a detrimental impact on safety or aircraft performance. Because SPK is purely paraffinic and absent of both aromatics and sulfur, it does not exhibit all of the desired properties expected from a jet fuel. For example, a gas to liquids Fischer-Tropsch-derived fuel is not considered an on-spec fuel in its pure state due to its lower density. Further, SPK fuels tend to have low volumetric energy density, which may require more fuel than can be accommodated in aircraft fuel tanks for long distance flights.

SUMMARY OF THE INVENTION

In accordance with certain aspects, provided is a method for upgrading a kerosene fuel to meet Jet A-1 specification or JP-8 specification;

a. providing a quantity of kerosene base fuel having a boiling point in the range of 130° C. to 300° C., at atmospheric pressure, flash point of 38° C. or above measured by ASTM D56, a density at 15° C. of at least 775 kg/m³ and freezing point of above −47° C.;

b. providing a quantity of synthetic cyclo-paraffinic kerosene fuel blending component comprising at least 99.5 mass % of carbon and hydrogen content and at least 50 mass % of cyclo-paraffin, said cyclo-paraffinic kerosene fuel blending component having a boiling point of at most 300° C., at atmospheric pressure, flash point of 38° C., or above, a density at 15° C. of at least 800 kg/m³, and freezing point of −60° C. or lower; and c. blending a quantity of the bio-based cyclo-paraffinic kerosene fuel blending component and the kerosene base fuel in amount sufficient to lower the freezing point of the blended fuel to −47° C. or lower.

In another embodiment, provided is a method for upgrading a kerosene fuel to meet AN-8 specification;

a. providing a quantity of kerosene base fuel having a boiling point in the range of 130° C. to 300° C., at atmospheric pressure, flash point of 38° C. or above measured by ASTM D56, and a density at 15° C. of at least 775 kg/m³ and freezing point of above −58° C.;

b. providing a quantity of synthetic cyclo-paraffinic kerosene fuel blending component comprising at least 99.5 mass % of carbon and hydrogen content and at least 50 mass % of cyclo-paraffin, said cyclo-paraffinic kerosene fuel blending component having a boiling point of at most 300° C., at atmospheric pressure, flash point of 38° C., or above, a density at 15° C. of at least 800 kg/m³, and freezing point of −60° C. or lower; and c. blending a quantity of the synthetic cyclo-paraffinic kerosene fuel blending component and the kerosene base fuel in amount sufficient to lower the freezing point of the blended fuel to −58° C. or lower.

In another embodiment, provided is a method for upgrading a kerosene fuel to meet Jet A or F-24 specification;

a. providing a quantity of kerosene base fuel having a boiling point in the range of 130° C. to 300° C., at atmospheric pressure, flash point of 38° C. or above measured by ASTM D56, a density at 15° C. of at least 775 kg/m³ and freezing point of above −40° C.;

b. providing a quantity of synthetic cyclo-paraffinic kerosene fuel blending component comprising at least 99.5 mass % of carbon and hydrogen content and at least 50 mass % of cyclo-paraffin, said cyclo-paraffinic kerosene fuel blending component having a boiling point of at most 300° C., at atmospheric pressure, flash point of 38° C., or above, a density at 15° C. of at least 800 kg/m³, and freezing point of −60° C. or lower; and c. blending a quantity of the synthetic cyclo-paraffinic kerosene fuel blending component and the kerosene base fuel in amount sufficient to lower the freezing point of the blended fuel to −40° C. or lower.

The features and advantages of the invention will be apparent to those skilled in the art. While numerous changes may be made by those skilled in the art, such changes are within the spirit of the invention.

BRIEF DESCRIPTION OF THE DRAWINGS

The drawings illustrate certain aspects of some of the embodiments of the invention, and should not be used to limit or define the invention.

DETAILED DESCRIPTION OF THE INVENTION

In an embodiment of the invention, it has been found that by blending a quantity of certain synthetic cyclo-paraffinic kerosene fuel blending components comprising at least 99.5 mass % of carbon and hydrogen content and at least 50 mass % of cyclo-paraffin into a kerosene base fuel, the fuel can be upgraded to meet certain specifications and/or increase its volumetric energy content for jet fuel applications.

In one embodiment, it has been found that the volumetric energy content of a fuel can be increased without increase in its aromatic content by:

a. providing a quantity of kerosene base fuel having a boiling point in the range of 130° C. to 300° C., at atmospheric pressure, flash point of 38° C. or above measured by ASTM D56, and a density at 15° C. of at least 760 kg/m$^3$, preferably at least 770 kg/m$^3$;

b. providing a quantity of a synthetic cyclo-paraffinic kerosene fuel blending component comprising at least 99.5 mass % of carbon and hydrogen content and at least 50 mass % of cyclo-paraffin, said cyclo-paraffinic kerosene fuel blending component having a boiling point of at most 300° C., at atmospheric pressure, flash point of 38° C. or above, a density at 15° C. of at least 800 kg/m$^3$, and freezing point of −60° C. or lower; and c. blending a quantity of the synthetic cyclo-paraffinic kerosene fuel blending component to the kerosene base fuel in amount effective to increase the volumetric energy content, preferably at least 0.1% increase in the volumetric energy content.

Volumetric energy content can be calculated as energy per unit volume using the following equation:

Energy per unit volume (MJ/m$^3$)=(energy per unit mass (MJ/kg))*(density (kg/m$^3$))

Energy per unit mass can be obtained by one of several methods, including ASTM D4529, D3338, D4809, or IP12 by way of example. The increase in volumetric energy content is relative so any of these methods can be used as long as the same method is used.

As used herein, "lower" in context of freezing points (e.g., the term "X° C. or lower") means that the temperature is equal to or lower than the X temperature. For example, for a freezing point of "−60° C. or lower", the temperature may be, for example, −60° C., −61° C., −65° C., −70° C., etc., as long as the temperature is not higher than −60° C.

In certain embodiments, the kerosene-based fuel component may originate from petroleum or be synthetically derived from biomass or other non-biomass resources. Aromatics content in a jet fuel can be determined by ASTM D1319. Aromatics content for synthetic blend components can be determined by ASTM D2425. The aromatic content of the blended jet fuel is typically determined by ASTM D1319. Equivalent total aromatic content between two fuels means the total aromatic content measured by these methods give an aromatic content within +/−1.5 vol. %. Minimal increase of aromatic content is generally less than 3 vol. %, preferably less than 2 vol. %, more preferably less than 1.5 vol. %, or more preferably without an increase that is within the precision of measurement for aromatic content, or even a decrease in aromatic content.

The method above may also produce a fuel having an improved smoke point as compared with the kerosene base fuel component without the cyclo-paraffinic kerosene fuel blending component. In an embodiment, the smoke point is at least 1 mm greater than the kerosene base fuel as measured by ASTM D1322.

ASTM International ("ASTM") and the United Kingdom Ministry of Defence ("MOD") have taken the lead roles in setting and maintaining specification for civilian aviation turbine fuel and jet fuel. The respective specifications issued by these two organizations are very similar, but not identical. Many other countries issue their own national specifications for jet fuel, but are very nearly or completely identical to either the ASTM or MOD specification. ASTM D1655 is the Standard Specification for Aviation Turbine Fuels and includes specifications for Jet A and Jet A-1. Defense Standard 91-91 is the MOD specification for Jet A-1 and is the dominant fuel specification for Jet A-1 outside of the United States.

Jet A-1 is the most common jet fuel and is produced to an internationally standardized set of specifications. In the United States, Jet A is the primary grade of jet fuel. Another jet fuel that is used in civilian aviation is called Jet B. Jet B is a wide-cut, lighter fuel in the naphtha-kerosene region that is used for its enhanced cold-weather performance Jet A and Jet A-1 are specified in ASTM D1655. Jet B is specified in ASTM D6615.

Alternatively, jet fuels are classified by militaries around the world with a different system of NATO or JP (Jet Propulsion) numbers. Some are almost identical to their civilian counterparts and differ only by the amounts of a few additives. For example, Jet A-1 is similar to JP-8. Both Jet A-1 and JP-8 specifications require a freezing point of −47° C. or lower. Jet A specification requires a freezing point of −40° C. or lower as does the military equivalent F-24. Jet B is similar to JP-4 that requires a freezing point of −58° C. or lower. Other jet fuel specifications for militaries may include JP-5 that requires a freezing point of −46° C. or lower and JP-7 that requires a freezing point of −43.3° C. or lower and the RP grades that requires a freezing point of −51° C. or lower.

Further, some jet fuel specification have more stringent requirement for flight in more challenging environments. For cold climates, such as the Antarctic, AN-8 has a jet fuel specification with a freezing point of −58° C. or lower. AN-8 fuel is used for turbine engines and other power applications that require low freeze point for low temperature applications and storage.

Typically, jet fuel is a product boiling for more than 90 vol. % at from 130° C. to 300° C. (ASTM D86), having a density in the range from 775 to 840 kg/m$^3$, preferably from 780 to 830 kg/m$^3$, at 15° C. (e.g. ASTM D4052), an initial boiling point in the range 130° C. to 190° C. and a final boiling point in the range 220° C. to 300° C., at atmospheric pressure, a flash point of 38° C. or above (ASTM D56), a kinematic viscosity at −20° C. (ASTM D445) suitably from 1.2 to 8.0 mm$^2$/s and a freeze point of −40° C. or below for Jet A specification, preferably −47° C. or below for Jet A-1 and JP-8 specifications, and preferably −58° C. or below for AN-8 specification.

Jet fuel will typically meet one or more of the following civil standards. Jet A-1 requirements are in ASTM D1655 or DEF STAN 91-91 (British Ministry of Defence Standard DEF STAN 91-91/Issue 7 amendment 3 of 2 Feb. 2015 (or later issues) for Turbine Fuel, Aviation "Kerosene Type," Jet A-1, NATO code F-35, Joint Service Designation AVTUR, or versions current at the time of testing), as well as some airport handling requirements of the IATA Guidance Material for Aviation Turbine Fuels Specifications. Jet A requirements are in ASTM D1655. Military jet fuel requirements are similar to civil requirements but usually more stringent for select properties and in the use of additives; these requirements are published by respective governments. For example, these can include MIL-DTL-83133 which defines JP-8 as used by US federal agencies.

Due to the differences in the specifications and depending on locations and intended use, it is desirable to upgrade the fuel to achieve the specification that the fuel must meet in order to fly in certain regions. For example, it may be desirable to upgrade a jet fuel which meets the Jet A specification to a fuel that has a lower freezing point consistent with the Jet A-1 specification requirement, particularly without an increase in its aromatic content. In another example, it may be desirable to upgrade a jet fuel to a cold climate specification, such as AN-8 jet fuel specification, which requires an even lower freezing point.

It has been found that by blending a quantity of synthetic cyclo-paraffinic kerosene fuel blending component comprising at least 99.5 mass % of carbon and hydrogen content and at least 50 mass % of cyclo-paraffin, the cyclo-paraffinic kerosene fuel blending component having a boiling point of at most 300° C., at atmospheric pressure, flash point of 38° C. or above, and a density at 15° C. of at least 800 kg/m$^3$, and freezing point of −60° C. or below, one can upgrade a kerosene base fuel to meet certain specifications.

As used herein, upgrading to meet a fuel specification means blending a fuel that does not meet the specification standard to meeting the standard for such fuel specification. For jet fuels, it is particularly desirable to upgrade the jet fuel without increasing its aromatic content. To meet a jet fuel specification property means that the jet fuel meets the requirements of at least one of the above mentioned specifications, as determined by standard test methods, such as from ASTM, IP, or other such industry-recognized standards bodies. Test methods for determining if a fuel meets a specification may include:

TABLE 1

Test for Jet Fuel Specification Properties

| Test | ASTM Method |
|---|---|
| Acidity (mgKOH/g) | D3242 |
| Density at 15° C. (g/cm$^3$) | D4052 |
| Hydrogen Content (mass %) | D7171 |
| Flash Point (° C.) | D56 |
| Freeze Point (° C.) | D5972 |
| Viscosity (mm$^2$/s) | D445 |
| Total Sulfur (mass %) | D4294 |
| Mercaptan sulfur (mass %) | D3227 |
| Smoke Point (mm) | D1322 |
| Naphthalenes (vol. %) | D1840 |
| Aromatics (vol. %) | D1319 |
| Net Heat of Combustion (MJ/kg) | D3338 |
| Initial Boiling Point (IBP) (° C.) | D86 |
| Final Boiling Point (FBP) (° C.) | D86 |

Kerosene Base Fuel or Kerosene Range Hydrocarbon Component

A kerosene base fuel or kerosene range hydrocarbon component is any kerosene that may be useful as a jet fuel, or a jet fuel blending component (other than the synthetic cyclo-paraffinic kerosene fuel blending component described herein) having a boiling point in the range of 130° C. to 300° C., at atmospheric pressure (as measured by ASTM D86), preferably in the range of 140° C. to 300° C., and most preferably in the range of 145° C. to 300° C. For a jet fuel blending component, the kerosene base fuel (whether single stream or a mixture) can have a flash point of 38° C. or above (measured by ASTM D56), and a density at 15° C. of at least 760 kg/m$^3$ (as measured by D4052). The kerosene base fuel or kerosene range hydrocarbon component may originate from petroleum or be synthetically derived from biomass, or other non-biomass resources. In certain embodiments, the kerosene base fuel may be any petroleum-derived jet fuel known to skilled artisans, including kerosene fuels meeting at least one of Jet A, Jet A-1, F-24, JP-8, Jet B or AN-8 specification. Preferably, the kerosene base fuel is a kerosene that can meet the jet fuel specification properties according to the invention.

For example, petroleum-derived kerosene fuels meeting Jet A or Jet A-1 requirements and a kerosene stream used in Jet A or Jet A-1 production are listed in Table 2. It is also contemplated that petroleum-derived kerosene fuels which do not meet Jet A or Jet A-1 specifications may be used as kerosene base fuels that can be upgraded to meet such specifications according to the present invention.

TABLE 2

Jet fuel Produced Using:

Straight run kerosene stream.
Caustic washing of straight run kerosene.
A sweetening process such as Merox ®, Merichem ®, or Bender process.
Hydroprocessed jet fuel.

As another example, the low boiling fraction as separated from a mineral gas oil may be used as such or in combination with petroleum-derived kerosene, suitably made at the same production location. As the low boiling fraction may already comply with a jet fuel specification, it is evident that the blending ratio between said component and the petroleum-derived kerosene may be freely chosen. The petroleum-derived kerosene will typically boil for more than 90 vol. % within the usual kerosene range of 145° C. to 300° C. (ASTM D86), depending on grade and use. It will typically have an initial boiling point in the range 130° C. to 190° C., and a final boiling point in the range 220° C. to 300° C. It will typically have a density from 775 to 840 kg/m$^3$ at 15° C. (e.g., ASTM D4052 or IP 365). Its kinematic viscosity at −20° C. (ASTM D445) might suitably be from 1.2 to 8.0 mm$^2$/s.

The kerosene base fuel or kerosene range hydrocarbon component may be a straight run kerosene fraction as isolated by distillation from a crude oil source or a kerosene fraction isolated from the effluent of typical refinery conversion processes, preferably hydrocracking. The kerosene fraction may also be the blend of straight run kerosene and kerosene as obtained in a hydrocracking process. Suitably the properties of the mineral derived kerosene are those of the desired jet fuel as defined above.

Aromatic content of the kerosene base fuel may vary in the range of 0 to 25 vol. %, preferably 3 to 25 vol. %, more preferably 15 to 20 vol. % based on the fuel (as measured by ASTM 1319). Typical density of the petroleum-derived kerosene at 15° C. is in the range of 775 kg/m$^3$ to 840 kg/m$^3$ (as measured by D4052). The kerosene base fuel most useful for the inventive process may have a density of at least 760 kg/m$^3$, more preferably at least 775 kg/m$^3$, to preferably at most 840 kg/m$^3$, and more preferably at most 820 kg/m$^3$. The aromatic content of the kerosene range hydrocarbon component for liquid rocket fuel may vary in the range of 0 to 10 vol. %, preferably to 0 to 5 vol. %.

The kerosene base fuel may be a single stream from a refining stream (petroleum-derived kerosene), or a mixture of one or more refining streams, or a mixture of refining streams and one or more synthetic kerosene components, or one or more synthetic kerosene streams (other than the synthetic cyclo-paraffinic blending component) approved by ASTM D7566 or equivalent specifications.

Synthetic Cyclo-paraffinic Kerosene Fuel Blending Component

The synthetic cyclo-paraffinic kerosene fuel blending component is generally characterized as a liquid composed of individual hydrocarbons useable as a jet fuel blending component and having at least the following properties: comprising at least 99.5 mass % of carbon and hydrogen content and at least 50 mass % of cyclo-paraffin.

For jet fuel applications, the cyclo-paraffinic kerosene fuel blending component can typically have a boiling point of at most 300° C., at atmospheric pressure; flash point of 38° C., or above; a density at 15° C. of at least 800 kg/m$^3$, preferably at least 810 kg/m$^3$, preferably at most 845 kg/m$^3$, more preferably at most 830 kg/m$^3$, most preferably in the range of 810 to 818 kg/m$^3$; and a freezing point of −60° C. or below, preferably of −65° C. or below, more preferably of −70° C. or below.

For rocket fuel applications, preferably the synthetic cyclo-paraffinic kerosene fuel blending component is generally characterized as a liquid composed of individual hydrocarbons useable as a rocket fuel blending component and having at least the following properties: comprising at least 99.5 mass % of carbon and hydrogen content and at least 50 mass % of cyclo-paraffin. The cyclo-paraffinic kerosene fuel blending component can typically have a flash point of at least 38° C., preferably at least 45° C., preferably at least 50° C., more preferably at least 55° C., more preferably at least 60° C.; a density at 15° C. of at least 799 kg/m$^3$; and a freezing point of −60° C. or lower, preferably of −65° C. or lower, more preferably of −70° C. or lower. Further, the cyclo-paraffinic kerosene fuel blending component can have good thermal stability for use in rocket fuel. The cyclo-paraffinic kerosene fuel blending component typically has a final boiling point below 300° C., more preferably below 290° C., more preferably below 280° C., most preferably below 274° C.

The synthetic cyclo-paraffinic kerosene fuel blending component preferably has a maximum iso-paraffin and n-paraffin content of less than 50 mass %, preferably less than 40 mass %, less than 35 mass %, or less than 30 mass % (ASTM D2425 or optionally can be measured by GC×GC). The synthetic cyclo-paraffinic kerosene fuel blending component preferably has at least 60 mass %, at least 65 mass %, or at least 70 mass % of cyclo-paraffinic content (ASTM D2425 or optionally can be measured by GC×GC). The aromatic content of the synthetic cyclo-paraffinic kerosene fuel blending component is preferably at most 1.5 mass %, at most 1 mass %, or at most 0.5 mass %. (ASTM D2425 or optionally can be measured by GC×GC).

In certain embodiments, the synthetic cyclo-paraffinic kerosene fuel blending component is derived from biomass (bio-derived cyclo-paraffinic kerosene fuel blending component). As used herein, the term "biomass" refers to, without limitation, organic materials produced by plants (such as leaves, roots, seeds and stalks), and microbial and animal metabolic wastes. Common biomass sources include: (1) agricultural residues, including corn stover, straw, seed hulls, sugarcane leavings, bagasse, nutshells, cotton gin trash, and manure from cattle, poultry, and hogs; (2) wood materials, including wood or bark, sawdust, timber slash, and mill scrap; (3) municipal solid waste, including recycled paper, waste paper and yard clippings; and (4) energy crops, including poplars, willows, switch grass, miscanthus, sorghum, alfalfa, prairie bluestream, corn, soybean, and the like. The term also refers to the primary building blocks of the above, namely, lignin, cellulose, hemicellulose and carbohydrates, such as saccharides, sugars and starches, among others.

Common biomass-derived feedstocks include lignin and lignocellulosic derivatives, cellulose and cellulosic derivatives, hemicellulose and hemicellulosic derivatives, carbohydrates, starches, monosaccharides, disaccharides, polysaccharides, sugars, sugar alcohols, alditols, polyols, and mixtures thereof. Preferably, the biomass-derived feedstock is derived from material of recent biological origin such that the age of the compounds, or fractions containing the compounds, is less than 100 years old, preferably less than 40 years old, and more preferably less than 20 years old, as calculated from the carbon 14 concentration of the feedstock.

The biomass-derived feedstocks may be derived from biomass using any known method. Solvent-based applications are well known in the art. Organosolv processes use organic solvents such as ionic liquids, acetone, ethanol, 4-methyl-2-pentanone, and solvent mixtures, to fractionate lignocellulosic biomass into cellulose, hemicellulose, and lignin streams (Paszner 1984; Muurinen 2000; and Bozell 1998). Strong-acid processes use concentrated hydrochloric acid, phosphoric acid, sulfuric acid or other strong organic acids as the depolymerization agent, while weak acid processes involve the use of dilute strong acids, acetic acid, oxalic acid, hydrofluoric acid, or other weak acids as the solvent. Enzymatic processes have also recently gained prominence and include the use of enzymes as a biocatalyst to deconstruct the structure of the biomass and allow further hydrolysis to useable feedstocks. Other methods include fermentation technologies using microorganisms, Fischer-Tropsch reactions and pyrolysis technologies, among others.

In one embodiment, the synthetic cyclo-paraffinic kerosene fuel blending component is derived from the conversion of a biomass-derived feedstock containing one or more carbohydrates, such as starch, monosaccharides, disaccharides, polysaccharides, sugars, and sugar alcohols, or derivatives from lignin, hemicellulose and cellulose using a bioreforming processes. As used herein, the term "bioreforming" refers to, without limitation, processes for catalytically converting biomass-derived oxygenated hydrocarbons to lower molecular weight hydrocarbons and oxygenated compounds using aqueous phase reforming, hydrogenation, hydrogenolysis, hydrodeoxygenation and/or other conversion processes involving the use of heterogeneous catalysts. Examples of various bioreforming processes include those technologies described in U.S. Pat. Nos. 8,053,615, 8,017,818 and 7,977,517 (all to Cortright and Blommel, and entitled "Synthesis of Liquid Fuels and Chemicals from Oxygenated Hydrocarbons"); U.S. Pat. No. 8,642,813 (to Qiao et al., and entitled "Reductive Biomass Liquefaction"); U.S. Patent Application Publication No. 2012/0198760 (to Blommel et al., and entitled Methods and Systems for Making Distillate Fuels from Biomass); and U.S. Patent Application Publication No. 2013/0263498 (to Kania et al., and entitled Production of Distillate Fuels from Biomass-Derived Polyoxygenates); and U.S. Patent Application Pub. No. 2013/0036660 (to Woods et al. and entitled "Production of Chemicals and Fuels from Biomass"), all of which are incorporated herein by reference.

Alternatively, the synthetic cyclo-paraffinic kerosene fuel blending component may be produced using natural gas or syngas-derived feedstocks used in a bioreforming process. For example, certain alkanols and other mixed oxygenated hydrocarbons derived from natural gas or syngas using Fischer-Tropsch type reactions may have application in the above described bioreforming processes, and can be used as a feedstock to provide the synthetic cyclo-paraffinic kerosene fuel blending component of the present invention.

In its application, a bioreforming process is used to convert oxygenated hydrocarbons to an intermediate stream of mixed oxygenates, with the resulting mixed oxygenates subsequently converted to $C_{8+}$ compounds containing the desired synthetic cyclo-paraffinic kerosene fuel blending component. Examples of various oxygenated hydrocarbons include any one or more sugars, such as glucose, fructose, sucrose, maltose, lactose, mannose or xylose, or sugar alcohols, such as arabitol, erythritol, glycerol, isomalt, lactitol, malitol, mannitol, sorbitol, xylitol, arabitol, glycol, and other oxygenated hydrocarbons. Additional non-limiting examples of oxygenated hydrocarbons include various alcohols, ketones, aldehydes, furans, hydroxy carboxylic acids, carboxylic acids, diols and triols.

The oxygenated hydrocarbons are reacted in an aqueous solution with hydrogen over a deoxygenation catalyst to produce a stream of mixed oxygenates. The oxygenates will generally include, without limitation, oxygenated hydrocarbons having 1 to 4 oxygen atoms (e.g., mono-, di-, tri- and tetra-oxygenated hydrocarbons). The mono-oxygenated hydrocarbons typically include alcohols, ketones, aldehydes, cyclic ethers, furans, and pyrans, while the di-oxygenated hydrocarbons typically include diols, hydroxy ketones, lactones, furfuryl alcohols, pyranyl alcohols, and carboxylic acids.

The deoxygenation catalyst is a heterogeneous catalyst having one or more active materials capable of catalyzing a reaction between hydrogen and the oxygenated hydrocarbons to remove one or more of the oxygen atoms from the oxygenated hydrocarbon to produce the oxygenates described above. The active materials may include, without limitation, Cu, Re, Fe, Ru, Ir, Co, Rh, Pt, Pd, Ni, W, Os, Mo, Ag, Au, alloys and combinations thereof, adhered to a support. The deoxygenation catalyst may include these elements alone or in combination with one or more Mn, Cr, Mo, W, V, Nb, Ta, Ti, Zr, Y, La, Sc, Zn, Cd, Ag, Au, Sn, Ge, P, Al, Ga, In, Tl, Ce and combinations thereof. The support may be any one of a number of supports, including a support having carbon, silica, alumina, zirconia, titania, tungsten, vanadia, chromia, zeolites, heteropolyacids, kieselguhr, hydroxyapatite, and mixtures thereof. The deoxygenation catalyst may also include an acidic support modified or constructed to provide a desired functionality. Heteropolyacids are a class of solid-phase acids exemplified by such species as $H_{3+x}PMo_{12-x}V_xO_{40}$, $H_4SiW_{12}O_{40}$, $H_3PW_{12}O_{40}$, and $H_6P2W_{18}O_{62}$, and have a well-defined local structure, the most common of which is the tungsten-based Keggin structure.

To produce oxygenates, a stream of oxygenated hydrocarbons is combined with water to provide an aqueous feedstock solution. The feedstock solution is then reacted with hydrogen in the presence of the deoxygenation catalyst at deoxygenation temperature and pressure conditions, and weight hourly space velocity, effective to produce the desired oxygenates. In condensed phase liquid reactions, the pressure within the reactor must be sufficient to maintain the reactants in the condensed liquid phase at the reactor inlet. For liquid phase reactions, the reaction temperature may be from about 80° C. to 300° C., and the reaction pressure from about 72 psig to 1300 psig. For vapor phase reactions, the reaction should be carried out at a temperature where the vapor pressure of the oxygenated hydrocarbon is at least about 0.1 atm (and preferably a good deal higher), and the thermodynamics of the reaction are favorable. This temperature will vary depending upon the specific oxygenated hydrocarbon compound used, but is generally in the range of from about 100° C. to 600° C. for vapor phase reactions.

The synthetic cyclo-paraffinic kerosene fuel blending component is subsequently produced using an acid condensation catalyst and a reactant stream that includes the mixed oxygenate stream above as a first reactant and a second reactant having an average oxygen to carbon ratio of 0.2 or less, in the presence of water. The first reactant (i.e., the mixed oxygenates produced above) can be generally described as having the formula $C_xH_yO_z$, with x representing 2 to 12 carbon atoms and z representing 1 to 12 oxygen atoms, and an average oxygen to carbon ratio of between 0.2 and 1.0. Collectively, the average oxygen to carbon ratio of the first reactant should be about 0.2 to 1.0, calculated as the total number of oxygen atoms (z) in the oxygenates of the first reactant divided by the total number of carbon atoms (x) in the oxygenates of the first reactant. Alternatively, the first reactant may have an average oxygen content per molecule of about 1 to 4, calculated as the total number of oxygen atoms (z) in the oxygenates of the first reactant divided by the total number of molecules of oxygenates in the first reactant. The total number of carbon atoms per molecule, oxygen atoms per molecule and total molecules in the first reactant may be measured using any number of commonly known methods, including (1) speciation by gas chromatography (GC), high performance liquid chromatography (HPLC), and other methods known to the art and (2) determination of total oxygen, carbon, and water content by elemental analysis. Oxygen present in water, carbon dioxide, or carbon monoxide is excluded from the determination of reactant oxygen to carbon ratio.

The second reactant includes one or more hydrocarbons and/or oxygenated hydrocarbons having a general formula $C_pH_rO_s$, with p representing 2 to 7 carbon atoms and s representing 0 to 1 oxygen atoms. When the second reactant is derived from a recycle stream as described below, the second reactant may also contain residual oxygenated hydrocarbons containing 2 oxygen atoms. Collectively, the average oxygen to carbon ratio of the second reactant should be less than 0.2, calculated as the total number of oxygen atoms (s) in the oxygenated hydrocarbons of the second reactant divided by the total number of carbon atoms (p) in the hydrocarbons and oxygenated hydrocarbons of the second reactant. Alternatively, the second reactant may have an average oxygen per molecule ratio of less than 1.5, calculated as the total number of oxygen atoms (s) in the oxygenated hydrocarbons of the second reactant divided by the total number of molecules of hydrocarbons and oxygenated hydrocarbons in the second reactant. The second reactant may also be characterized as having an average normal boiling point of less than 210° C., or less than 200° C., or less than 190° C.

The second reactant will generally include $C_{7-}$ alkanes, $C_{7-}$ alkenes, $C_{7-}$ cycloalkanes, $C_{7-}$ cycloalkenes, $C_{7-}$ alcohols, $C_{7-}$ ketones, $C_{7-}$ aryls, and mixtures thereof. Examples of the second reactant compounds include, without limitation, $C_{7-}$ alkanes and $C_{7-}$ alkenes having from 4 to 7 carbon atoms ($C_{4-7}$ alkanes and $C_{4-7}$ alkenes), such as butane, iso-butane, butene, isobutene, pentane, pentene, 2-methylbutane, hexane, hexene, 2-methylpentane, 3-methylpentane, 2,2-dimethylbutane, 2,3-dimethylbutane, cyclohexane, heptane, heptene, methyl-cyclohexane and isomers thereof. The $C_{7-}$ aryls will generally consist of an aromatic hydrocarbon having 6 or 7 carbon atoms, whether in either an unsubstituted (phenyl), mono-substituted or multi-substituted form. The $C_{7-}$ cycloalkanes and $C_{7-}$ cycloalkenes have 5, 6 or 7 carbon atoms and may be unsubstituted, mono-substituted or multi-substituted. In the case of mono-substituted and multi-substituted compounds, the substituted group may include straight chain $C_{1-2}$ alkyls, straight chain $C_2$ alkylenes, straight chain $C_2$ alkynes, or combinations thereof. Examples of desirable $C_{7-}$ cycloalkanes and $C_{7-}$ cycloalkenes include, without limitation, cyclopentane, cyclopentene, cyclohexane, cyclohexene, methyl-cyclopentane, methyl-cyclopentene, ethyl-cyclopentane, ethyl-cyclopentene, and isomers thereof.

The second reactant may be provide from any source, but is preferably derived from biomass or a biomass-derived feedstock. For example, although a biomass-derived feedstock is preferred, it is contemplated that all or a portion of the second reactant may originate from fossil fuel based compounds, such as natural gas or petroleum. All or a portion of the second reactant may also originate from any one or more fermentation technologies, gasification technologies, Fischer-Tropsch reactions, or pyrolysis technologies, among others. Preferably, at least a portion of the second reactant is derived from the product stream and recycled to be combined with the first reactant to provide at least a portion of the reactant stream.

When a portion of the second reactant is derived from the product stream following the condensation reaction, the product stream is separated into a first portion containing $C_{8+}$ compounds and a second portion containing $C_{7-}$ compounds to be recycled and used as a portion of the second reactant. Alternatively, the product stream may be first separated to a water fraction and an organic fraction, with the organic fraction then separated into a first portion containing the desired $C_{8+}$ compounds and a second portion containing the $C_{7-}$ compounds to be recycled and used as a portion of the second reactant. Processes for separating liquid mixtures into their component parts or fractions are commonly known in the art, and often involve the use of a separator unit, such as one or more distillation columns, phase separators, extractors, purifiers, among others.

The condensation reaction is performed using catalytic materials that exhibit acidic activity. These materials may be augmented through the addition of a metal to allow activation of molecular hydrogen for hydrogenation/dehydrogenation reactions. The acid condensation catalyst may be either an acidic support or an acidic heterogeneous catalyst comprising a support and an active metal, such as Pd, Pt, Cu, Co, Ru, Cr, Ni, Ag, alloys thereof, or combinations thereof. The acid condensation catalyst may include, without limitation, aluminosilicates, tungstated aluminosilicates, silica-alumina phosphates (SAPOs), aluminum phosphates (ALPO), amorphous silica alumina (ASA), acidic alumina, phosphated alumina, tungstated alumina, zirconia, tungstated zirconia, tungstated silica, tungstated titania, tungstated phosphates, acid modified resins, heteropolyacids, tungstated heteropolyacids, silica, alumina, zirconia, titania, tungsten, niobia, zeolites, mixtures thereof, and combinations thereof. The acid condensation catalyst may include the above alone or in combination with a modifier or metal, such as Re, Cu, Fe, Ru, Ir, Co, Rh, Pt, Pd, Ni, W, Os, Mo, Ag, Au, alloys thereof, and combinations thereof.

Examples of applicable acidic condensation catalysts include bifunctional pentasil zeolites, such as ZSM-5, ZSM-8 or ZSM-11. The zeolite with ZSM-5 type structure is a particularly preferred catalyst. Other suitable zeolite catalysts include ZSM-12, ZSM-22, ZSM-23, ZSM-35 and ZSM-48. Zeolite ZSM-5, and the conventional preparation thereof, is described in U.S. Pat. No. 3,702,886; Re. 29,948 (highly siliceous ZSM-5); U.S. Pat. Nos. 4,100,262 and 4,139,600, all incorporated herein by reference. Zeolite ZSM-11, and the conventional preparation thereof, is described in U.S. Pat. No. 3,709,979, which is also incorporated herein by reference. Zeolite ZSM-12, and the conventional preparation thereof, is described in U.S. Pat. No. 3,832,449, incorporated herein by reference. Zeolite ZSM-23, and the conventional preparation thereof, is described in U.S. Pat. No. 4,076,842, incorporated herein by reference. Zeolite ZSM-35, and the conventional preparation thereof, is described in U.S. Pat. No. 4,016,245, incorporated herein by reference. Another preparation of ZSM-35 is described in U.S. Pat. No. 4,107,195, the disclosure of which is incorporated herein by reference. ZSM-48, and the conventional preparation thereof, is taught by U.S. Pat. No. 4,375,573, incorporated herein by reference. Other examples of zeolite catalysts are described in U.S. Pat. Nos. 5,019,663 and 7,022,888, also incorporated herein by reference.

The specific $C_{8+}$ compounds produced will depend on various factors, including, without limitation, the make-up of the reactant stream, the type of oxygenates in the first reactant, the hydrocarbons and oxygenated hydrocarbons in the second reactant, the concentration of the water, condensation temperature, condensation pressure, the reactivity of the catalyst, and the flow rate of the reactant stream as it affects the space velocity (the mass/volume of reactant per unit of catalyst per unit of time), gas hourly space velocity (GHSV), and weight hourly space velocity (WHSV). The condensation temperature and pressure conditions may be selected to more favorably produce the desired products in the vapor-phase or in a mixed phase having both a liquid and vapor phase. In general, the condensation reaction should be conducted at a temperature and pressure where the thermodynamics of the reactions are favorable. In general, the condensation temperature should be between 100° C. and 400° C. and the reaction pressure between 72 psig and 2000 psig.

The above condensation reactions result in the production of $C_{8+}$ alkanes, $C_{8+}$ alkenes, $C_{8+}$ cycloalkanes, $C_{8+}$ cycloalkenes, $C_{8+}$ aryls, fused aryls, $C_{8+}$ alcohols, $C_{8+}$ ketones, oxygenated $C_{8+}$ aryls, oxygenated fused aryls, and mixtures thereof. The $C_{8+}$ alkanes and $C_{8+}$ alkenes have 8 or more carbon atoms, and may be branched or straight chained alkanes or alkenes. The $C_{8+}$ alkanes and $C_{8+}$ alkenes may also include fractions containing $C_8$, $C_9$, $C_{10}$, $C_{11}$, $C_{12}$, $C_{13}$, $C_{14}$ compounds ($C_{8-14}$ fraction), or $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$ compounds ($C_{12-24}$ fraction), or more than 25 carbon atoms ($C_{25+}$ fraction), with the $C_{8-14}$ fraction directed to the synthetic cyclo-paraffinic kerosene fuel blending component, the $C_{12-24}$ fraction directed to diesel fuel, and the $C_{25+}$ fraction directed to heavy oils and other industrial applications. Examples of various $C_{8+}$ alkanes and $C_{8+}$ alkenes include, without limitation, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $C_{8+}$ cycloalkanes and $C_{8+}$ cycloalkenes have 8 or more carbon atoms and may be unsubstituted, mono-substituted or multi-substituted. In the case of mono-substituted and multi-substituted compounds, the substituted group may include a branched $C_{3+}$ alkyl, a straight chain $C_{1+}$ alkyl, a branched $C_{3+}$ alkylene, a straight chain $C_{2+}$ alkylene, a straight chain $C_{2+}$ alkyne, a phenyl or a combination thereof. In one embodiment, at least one of the substituted groups include a branched $C_{3+}$ alkyl, a straight chain $C_{1+}$ alkyl, a branched $C_{3+}$ alkylene, a straight chain $C_{2+}$ alkylene, a straight chain $C_{2+}$ alkyne, a phenyl or a combination thereof. Examples of desirable $C_{8+}$ cycloalkanes and $C_{8+}$ cycloalkenes include, without limitation, ethyl-cyclopentane, ethyl-cyclopentene, ethyl-cyclohexane, ethyl-cyclohexene, and isomers thereof.

The $C_{8+}$ product compounds may also contain high levels of alkenes, alcohols and/or ketones, which may be undesirable in certain fuel applications or which lead to coking or deposits in combustion engines, or other undesirable combustion products. In such event, the $C_{8+}$ compounds may undergo a finishing step. The finishing step will generally involve a hydrotreating reaction that removes a portion of the remaining carbon-carbon double bonds, carbonyl, hydroxyl, acid, ester, and ether groups.

The moderate fractions above ($C_8$-$C_{18}$) may be separated for use as the synthetic cyclo-paraffinic kerosene fuel blending component, while the $C_{12}$-$C_{24}$ fraction may be separated for diesel fuel, and the heavier fraction ($C_{25+}$) separated for use as a heavy oil or cracked to produce additional gasoline and/or diesel fractions. A $C_{12}$-$C_{18}$ fraction can also be separated for rocket fuel applications. Separation processes are well known in the art and generally involve one or more distillation columns designed to facilitate the separation of desired compounds from a product stream. The distillation will be generally operated at a temperature, pressure, reflux ratio, and with an appropriate equipment design, to recover the portion of the $C_{8+}$ compounds which conform to the boiling point characteristics of the synthetic cyclo-paraffinic kerosene fuel blending component as described above.

Additional Propulsion Fuel Blending Component

The additional propulsion fuel blending component may be any fuel blending component which can be considered a kerosene base fuel as described above. The additional propulsion fuel blending component may also be naphtha generally used for blending to manufacture Jet B fuel.

Other Components

Optionally, the fuel composition may further comprise a fuel additive known to a person of ordinary skill in the art. In certain embodiments, the fuel additive can be used from about 0.00005% by weight to about 0.20% by volume, based on the total weight or volume of the fuel composition. The fuel additive can be any fuel additive approved for use in jet fuel or rocket fuel known to those of skill in the art. In further embodiments, the fuel additive may be antioxidants, thermal stability improvers, lubricity improvers, fuel system icing inhibitors, metal deactivators, static dissipaters, other aviation-approved additives and combinations thereof.

The amount of a fuel additive in the fuel composition disclosed herein may be from about 0.00005% by weight to less than about 0.20% by volume, based on the total amount of the fuel composition. In some embodiments, the amount is in wt. % based on the total weight of the fuel composition. In other embodiments, the amount is in vol. % based on the total volume of the fuel composition. In yet other embodiments, the amount is in mass per volume of the fuel composition. The amount will normally be within limits mandated or recommended within the appropriate fuel specification.

Illustrative examples of fuel additives are described in greater detail below. Lubricity improvers are one example. They were first used in aviation fuels as corrosion inhibitors to protect ferrous metals in fuel handling systems, such as pipelines and fuel storage tanks, from corrosion. It was discovered that they also provided additional lubricity performance, reducing the wear in components of the aircraft engine fuel system, such as gear pumps and splines, where thin fuel layers separate moving metal components. Nowadays, these additives are only used for lubricity improvement. The lubricity improver may be present in the fuel composition at a concentration up to about 23 mg/L, based on the total volume of the fuel composition, and in accordance with jet fuel specification limits.

Antioxidants can also be used herein. Antioxidants prevent the formation of gum depositions on fuel system components caused by oxidation of fuels in storage and/or inhibit the formation of peroxide compounds in certain fuel compositions. The antioxidant may be present in the fuel composition at a concentration up to 24 mg/L, based on the total volume of the fuel composition.

Static dissipaters reduce the effects of static electricity generated by movement of fuel through high flow-rate fuel transfer systems. The static dissipater may be present in the fuel composition at a concentration up to about 5 mg/L, based on the total volume of the fuel composition.

Fuel system icing inhibitors (also referred to as anti-icing additives) reduce the freezing point of water precipitated from jet fuels due to cooling at high altitudes and prevent the formation of ice crystals which could restrict the flow of fuel to the engine. Certain fuel system icing inhibitors can also act as a biocide. The fuel system icing inhibitor may be present intentionally in the fuel composition at a concentration from about 0.02 to about 0.2 volume %, based on the total volume of the fuel composition.

Metal deactivators suppress the catalytic effect that some metals, particularly copper, have on fuel oxidation. The metal deactivator may be present in the fuel composition at a concentration up to about 5.7 mg/L active matter, based on the total volume of the fuel composition.

Thermal stability improvers are used to inhibit deposit formation in the high temperature areas of the aircraft fuel system. The thermal stability improver may be present in the fuel composition at a concentration up to about 256 mg/L, based on the total volume of the fuel composition.

Blending and Using

In certain embodiments, volumetric energy content of a jet fuel can be increased with minimal increase of the aromatic content of the fuel. By the term minimal increase of aromatic content, typically the increase in aromatic content is less than 2 vol %, preferably less than 1.5 vol %, or preferably without an increase that is within the precision of measurement for aromatic content, or preferably even decreasing, based on the jet fuel. Higher volumetric energy content is usually associated with higher aromatics. Thus, it is unexpected to increase the volumetric energy content of a fuel without an increase in its aromatic content.

A quantity of kerosene base fuel as described above (which is different or other than cyclo-paraffinic kerosene fuel blending component) may be blended with a quantity of the synthetic cyclo-paraffinic kerosene fuel blending component in an amount effective or sufficient to increase the volumetric energy content of the final blended fuel compared to the kerosene base fuel, preferably at least 0.1% increase in the volumetric energy content as calculated from the Net Heat of Combustion estimated by ASTM D3338 and multiplied by density.

In some embodiments, the smoke point of the blended fuel may also increase compared with the kerosene base fuel.

Optionally, the blended fuel may be blended with an additional propulsion fuel blending component to produce the kerosene-based propulsion fuel.

The propulsion fuel may be blended at refineries or terminals, in tankers, or at the location of application, as well as at any other location that may have blending capabilities. Various methods and equipment required for such blending activities are commonly known in the art, and may be applied as needed depending on the particular propulsion fuel desired.

The amount of the synthetic cyclo-paraffinic kerosene fuel blending component may suitably be in an amount of 1 to 97 vol. %, preferably 3 to 97 vol. %, preferably 5 to 97 vol. %, more preferably 10 to 97 vol. %, more preferably 15 to 97 vol. % provided that the amount is sufficient to increase volumetric energy content at least 0.1%. The amount may vary depending on the kerosene base fuel and/or the desired specification to upgrade to and/or amount of desired volumetric energy content increase desired. The amount of the synthetic cyclo-paraffinic kerosene fuel blending component of the blend is preferably at least 1 vol. %, preferably at least 3 vol. %, more preferably at least 5 vol. %, more preferably at least 10 vol. %, more preferably at least 15 vol. %, based on the blended fuel. The amount of the synthetic cyclo-paraffinic kerosene fuel blending component will vary depending on the kerosene base fuel used.

The kerosene base fuel may be upgraded to meet Jet A-1 specification or JP-8 specification (e.g., when the kerosene base fuel has a freezing point of above −47° C.) by blending the synthetic cyclo-paraffinic kerosene fuel blending component in an amount effective or sufficient to lower the freezing point of the blended fuel to −47° C. or lower. For example, Jet A or F-24 jet fuel may be upgraded to meet Jet A-1 or JP-8 specification in such manner.

In some embodiments, the kerosene base fuel may be upgraded to meet AN-8 specification (e.g., when the kerosene base fuel has a freezing point of above −58° C.) by blending the synthetic cyclo-paraffinic kerosene fuel blending component in an amount effective or sufficient to lower the freezing point of the blended fuel to −58° C. or lower. For example, any one of Jet A, F-24, Jet A-1, JP-8, or JP-5 jet fuel may be upgraded to meet Jet AN-8 specification.

In some embodiments, the kerosene base fuel is upgraded to meet Jet A specification (e.g., when the kerosene base fuel has a freezing point of above −40° C.) by blending the synthetic cyclo-paraffinic kerosene fuel in an amount effective or sufficient to lower the freezing point of the blended fuel to −40° C. or lower. For example, refinery streams, synthetic fuel streams and mixtures thereof that have a freezing point of above −40° C. and/or have a density of at least 760 kg/m$^3$ may be upgraded to meet Jet A specification.

In certain embodiments, a kerosene fuel can be upgraded to meet Jet A-1 specification or JP-8 specification by;
 a. providing a quantity of kerosene base fuel having a boiling point in the range of 130° C. to 300° C., at atmospheric pressure, flash point of 38° C. or above measured by above measured by ASTM D56, a density at 15° C. of at least 775 kg/m$^3$ and freezing point of above −47° C.;
 b. providing a quantity of synthetic cyclo-paraffinic kerosene fuel blending component described above; and
 c. blending a quantity of the synthetic cyclo-paraffinic kerosene fuel blending component to the kerosene base fuel in amount sufficient to lower the freezing point of the blended fuel to −47° C. or lower.

In certain embodiments, a kerosene fuel can be upgraded to meet AN-8 specification by;
 a. providing a quantity of kerosene base fuel having a boiling point in the range of 130° C. to 300° C., at atmospheric pressure, flash point of 38° C. or above measured by ASTM D56, and a density at 15° C. of at least 775 kg/m$^3$ and freezing point of above −58° C.;
 b. providing a quantity of synthetic cyclo-paraffinic kerosene fuel blending component described above; and
 c. blending a quantity of the synthetic cyclo-paraffinic kerosene fuel blending component to the kerosene base fuel in amount sufficient to lower the freezing point of the blended fuel to −58° C. or lower.

In certain embodiments, a kerosene fuel can be upgraded to meet Jet A specification by;
 a. providing a quantity of kerosene base fuel having a boiling point in the range of 130° C. to 300° C., at atmospheric pressure, flash point of 38° C. or above measured by ASTM D56, a density at 15° C. of at least 760 kg/m$^3$ and freezing point of above −40° C.;
 b. providing a quantity of synthetic cyclo-paraffinic kerosene fuel blending component described above; and
 c. blending a quantity of the synthetic cyclo-paraffinic kerosene fuel blending component to the kerosene base fuel in amount sufficient to lower the freezing point of the blended fuel to −40° C. or lower.

In some embodiments, the blended jet fuel may preferably have a density of equal or above 800 kg/m$^3$. The blended jet fuel may preferably have an aromatic content of less than or equal to 25 vol %, more preferably less than or equal to 20 vol %.

In some embodiments, the inventive method may be used to meet any of the standard specifications for Aviation Turbine fuels described above.

The increase in volumetric energy content and/or smoke point increase can be seen by operating a jet engine comprising burning the jet fuel produced by the method described above in such jet engine.

In another aspect, a fuel system is provided comprising a fuel tank containing the fuel composition produced by the methods described above. Optionally, the fuel system may further comprise an engine cooling system having a recirculating engine coolant, a fuel line connecting the fuel tank with the internal combustion engine, and/or a fuel filter arranged on the fuel line. Some non-limiting examples of internal combustion engines include reciprocating engines (e.g., diesel engines), jet engines, some rocket engines, and gas turbine engines.

In some embodiments, the fuel tank is arranged with a cooling system so as to allow heat transfer from the recirculating engine coolant to the fuel composition contained in the fuel tank. In other embodiments, the fuel system further comprises a second fuel tank containing a second fuel for a jet engine and a second fuel line connecting the second fuel tank with the engine. Optionally, the first and second fuel lines can be provided with electromagnetically operated valves that can be opened or closed independently of each other or simultaneously.

In another aspect, an engine arrangement is provided comprising an internal combustion engine, a fuel tank containing the fuel composition disclosed herein, a fuel line connecting the fuel tank with the internal combustion engine. Optionally, the engine arrangement may further comprise a fuel filter and/or an engine cooling system comprising a recirculating engine coolant. In some embodiments, the internal combustion engine is a jet engine.

The smoke point increase can be seen by burning the jet fuel produced by the methods described above by providing the jet fuel to the fuel system and/or jet engine and operating such fuel system and/or jet engine.

As used herein, a "low" or "lower" in the context of propulsion fuel properties embraces any degree of decrease or reduction compared to an average commercial petroleum jet fuel property containing equivalent total aromatics content under the same or equivalent conditions.

As used herein, a "high" or "higher" in the context of propulsion fuel properties embraces any degree of increase compared to an average commercial petroleum jet fuel property containing equivalent total aromatics content under the same or equivalent conditions.

As used herein, an "increase" in the context of propulsion properties embraces any degree of increase compared to a previously measured jet fuel property under the same or equivalent conditions. Thus, the increase is suitably compared to the jet fuel property of the fuel composition prior to incorporation of the synthetic cyclo-paraffinic kerosene fuel blending component. Alternatively, the property increase may be measured in comparison to an otherwise analogous jet fuel composition (or batch or the same fuel composition); for example, which is intended (e.g., marketed) for use in a jet turbine engine, without adding the bio-based cyclo-paraffinic kerosene fuel blending component to it.

As used herein, a "decrease" or "reduction" in the context of propulsion fuel properties embraces any degree of decrease or reduction compared to a previously measured jet fuel property under the same or equivalent conditions. Thus, the decrease or reduction is suitably compared to the property of the jet fuel composition prior to incorporation of the synthetic cyclo-paraffinic kerosene fuel blending component. Alternatively, the property decrease may be measured in comparison to an otherwise analogous jet fuel composition (or batch or the same fuel composition); for example, which is intended (e.g., marketed) for use in a jet turbine engine, without adding the synthetic cyclo-paraffinic kerosene fuel blending component to it.

In the context of the present invention, "use" of a synthetic cyclo-paraffinic kerosene fuel blending component in a propulsion fuel composition means incorporating the component into the jet fuel, typically as a blend (i.e., a physical mixture) with one or more jet fuel components and optionally with one or more jet fuel additives.

Accordingly, in one embodiment of the invention, there is provided the use of a synthetic cyclo-paraffinic kerosene fuel blending component described above to increase the volumetric energy content of a jet fuel. Accordingly, in another embodiment of the invention, there is provided the use of a synthetic cyclo-paraffinic kerosene fuel blending component described above to upgrade a kerosene base fuel to meet a Jet A-1 specification. Accordingly, in another embodiment of the invention, there is provided the use of a synthetic cyclo-paraffinic kerosene fuel blending component described above to upgrade a kerosene base fuel to meet a Jet A specification. Accordingly, in another embodiment of the invention, there is provided the use of a synthetic cyclo-paraffinic kerosene fuel blending component described above to upgrade a kerosene base fuel to meet a Jet AN-8 specification.

Suitably, the synthetic cyclo-paraffinic kerosene fuel blending component described above is used in an amount to increase the smoke point, preferably to increase the smoke point at least 1 mm greater than the kerosene base fuel (e.g., petroleum based jet fuel) as measured by ASTM D1322 (automated method). When using a jet fuel composition prepared by the method disclosed herein, a jet airplane equipped with a jet turbine engine, a fuel tank containing the jet fuel composition prepared according to methods disclosed herein, and a fuel line connecting the fuel tank with the jet turbine engine. Thus, a jet engine may be operated by burning in such jet engine a jet fuel described herein.

Accordingly, in another embodiment of the invention, there is provided the use of a synthetic cyclo-paraffinic kerosene fuel blending component comprising at least 99.5 mass % of carbon and hydrogen content and at least 50 mass % of cyclo-paraffin, said cyclo-paraffinic kerosene fuel blending component having a boiling point of at most 300° C., at atmospheric pressure, flash point of at least 38° C., a density at 15° C. of at least 799 kg/m$^3$, and a freezing point of −60° C. or lower, to produce a liquid rocket fuel.

While the invention is susceptible to various modifications and alternative forms, specific embodiments thereof are shown by way of examples herein described in detail. It should be understood, that the detailed description is not intended to limit the invention to the particular form disclosed, but on the contrary, the intention is to cover all modifications, equivalents and alternatives falling within the spirit and scope of the present invention as defined by the appended claims. The person skilled in the art will readily understand that, while the invention is illustrated making reference to one or more a specific combinations of features and measures, many of those features and measures are functionally independent from other features and measures such that they can be equally or similarly applied independently in other embodiments or combinations.

The present invention will be illustrated by the following illustrative embodiment, which is provided for illustration only and is not to be construed as limiting the claimed invention in any way.

Illustrative Examples

Test Methods

Jet Fuel Specification Tests and Methods

A jet fuel can be verified to meet a given specification by testing the fuel's properties specified by the governing specification.

Energy Per Unit Volume or Energy Per Unit Mass

The energy per unit mass (or gravimetric energy density) of a fuel is simply its Net Heat of Combustion as determined by ASTM D3338. The energy per unit volume (or volumetric energy density) can be calculated by multiplying the fuel's Net Heat of Combustion (determined by ASTM D3338) by the fuel's density (determined by ASTM D4052).

Materials

Comparative Examples

A petroleum-derived jet fuel sourced from Convent Terminal in Convent, La. is provided as a comparative example of Jet A or a kerosene base fuel component. A synthetic jet fuel component sourced from Shell Middle Distillate Synthesis plant in Bintulu, Malaysia having (99.9 wt. % paraffin content with iso-paraffin and n-paraffin content of 98.7 wt. %) is provided as a comparative example of GTL1. Another synthetic jet fuel component sourced from Pearl GTL plant in Qatar having (100.0 wt. % paraffin content with iso-paraffin and n-paraffin content of 96.3 wt. %) is provided as a comparative example of GTL2. A jet fuel component from hydroprocessed esters and fatty acid sourced from UOP having (98.1 mass % paraffins, 1.9 mass % cyclo-paraffins) is provided as a comparative example of HEFA. The specification properties for each comparative example are summarized in Table 3 below.

TABLE 3

Specification Properties of Fuel Components

| Test | ASTM Method | Jet A | GTL1 | GTL2 | HEFA |
|---|---|---|---|---|---|
| Acidity (mgKOH/g) | D3242 | 0.003 | 0.001 | 0.001 | 0.003 |
| Density at 15° C. (-kg/m$^3$) | D4052 | 798.4 | 735.9 | 753.8 | 756.7 |
| Hydrogen Content (mass %) | D5291 | 14.005 | 15.595 | 15.42 | 14.73 |
| Flash Point (° C.) | D56 | 45 | 43 | 56.5 | 43 |
| Freeze Point (° C.) | D5972 | −43.2 | −54.6 | −49.3 | −57.3 |
| Viscosity (mm$^2$/s) at −20° C. | D445 | 4.037 | 2.450 | 4.146 | 4.795 |
| Total Sulfur (ppm) | D5453 | NA | <1* | 1 | <1* |
| Total Sulfur (mass %) | D4294 | 0.151 | NA | NA | NA |
| Mercaptan sulfur (mass %) | D3227 | 6 | NA | NA | NA |
| Smoke Point (mm) (automated) | D1322 | 24.3 | >50.0* | >50.0* | >50.0* |
| Naphthalenes (vol. %) | D1840 | 1.26 | NA | 0.0 | NA |
| Aromatics (vol. %) | D1319 | 17.5 | NA | NA | NA |
|  | D6379 | NA | 0.1 | <0.1* | 0.1 |
| Net Heat of Combustion (MJ/kg) | D3338 | 43.318 | 44.246 | 44.136 | 44.145 |
| Distillation Temperature at 10% Boiling Point (° C.) | D86 | 176.2 | 161.0 | 184.4 | 162.9 |
| Final Boiling Point (° C.) | D86 | 274.4 | 195.9 | 234.3 | 277.8 |

*Actual values were beyond the indicated detection limit

Example 1—Production of Synthetic Cyclo-Paraffinic Kerosene from Corn Starch

A three step catalytic process as described above utilizing aqueous phase reforming (APR), dehydration/oligomerization (DHOG) and hydrotreating (HT), was used to convert corn syrup to cyclo-paraffin-rich organic product. Two distinct beds of APR catalyst developed by Virent, Inc. (Madison, Wis.) were used. The first APR catalyst included palladium, molybdenum, and tin metals on a tungsten modified zirconia support, while the second APR catalyst included palladium and silver metals on a tungsten modified zirconia support. The DHOG catalyst included palladium and silver metals on a tungsten modified zirconia support, also provided by Virent, Inc. The HT catalyst was prepared by CRI with a nickel metal loading on an alumina support.

The catalysts were loaded into separate fixed-bed, tubular reactors configured in series such that the liquid product from one step was fed to the next step. A 60% 43DE corn syrup in water mixture by weight was fed across the system with the process conditions shown in Table 4.

TABLE 4

Start of Run Conditions for APR, DHOG, and HT

|  |  | APR I | APR II | DHOG | HT |
|---|---|---|---|---|---|
| WHSV | wt$_{feed}$/(wt$_{catalyst}$ hr) | 0.8 | 0.8 | 0.8 | 1.6 |
| Added Hydrogen | mol$_{H2}$/mol$_{feed}$ | 1.4 | 0.8 | — | 0.5 |
| Average Reactor Temperature | ° C. | 210 | 250 | 280 | 370 |
| Pressure | Psig | 1800 | 900 | 900 | 1300 |

A two-pass hydrotreating configuration was used. The hydrotreating process included an intermediate distillation step in between each pass to remove the components heavier than the 300° C. end point for jet fuel. The liquid from the HDO-DHOG-HT train was fractionated continuously within the same plant. The SK fraction was collected, combined all together, and re-fed across the HT catalyst and fractionation portion of the plant at the same conditions shown in Table 4 for the HT step.

The resulting product composition of the liquid organic product is shown in Table 5, which includes a comparison of the composition and carbon number of the product pre-fractionation, after the first HT pass, and after the second HT pass.

For alternative applications, the fractionation can be tuned to produce a diesel fraction that is primarily $C_{12}$-$C_{24}$, or a rocket fuel application that is primarily $C_{12}$-$C_{18}$ (rocket fuel cut).

TABLE 5

Liquid Organic Product Composition by GCxGC—Full Range and SK fraction

| Speciation | | Full Range Pre-fractionation | SK Fraction Post-fractionation 1 Pass HT | SK Fraction Post-fractionation 2 Pass HT |
|---|---|---|---|---|
| Cyclo-paraffins | wt. % | 37.3 | 52.2 | 82.2 |
| Paraffins | wt. % | 14.3 | 14.6 | 16.9 |
| Aromatics | wt. % | 6.5 | 27.8 | 0.5 |
| PNA | wt. % | 0.5 | 2.1 | 0.0 |
| Unclassified* | wt. % | 41.4 | 3.4 | 0.6 |
| Total | wt. % | 100.0 | 100.0 | 100.0 |
| Carbon Number | | | | |
| C7- | wt. % | 33.2 | 1.7 | 0.8 |
| C8-C18 | wt. % | 52.4 | 95.6 | 98.5 |
| C19+ | wt. % | 13.6 | 2.4 | 0.4 |
| Unclassified | wt. % | 0.8 | 0.4 | 0.3 |
| Total | wt. % | 100.0 | 100.0 | 100.0 |

*Method set up to look for compounds between C7-C18 in jet fuel range, so C7- and C19+ compounds are not classified into a class. In case of "Full Range" material, majority of "Unclassified" compounds were paraffins.

The process was run to produce greater than 420 liters (110 gallons) of synthetic cyclo-paraffinic kerosene for product testing. The product was stored in two 55 gallon drums and one 16 gallon drum. 20 milligrams per liter of butylated hydroxyltoluene (BHT) antioxidant additive was added to each drum as is standard fuel handling practice for jet fuel. Examples 3 were tested fuel from this example.

Example 2—Production of Synthetic Cyclo-Paraffinic Kerosene from Lignocellulose A woody biomass material was deconstructed by a 3rd party to produce a hydrolysate. This hydrolysate was ion exchanged to remove inorganic impurities and diluted so the carbon containing fraction was 50% by weight, with the balance being water.

A three step catalytic process as described in Example 1 utilizing aqueous phase reforming (APR), dehydration/oligomerization (DHOG) and hydrotreating (HT) was used to convert the hydrolysate to cyclo-paraffinic rich organic product under the process conditions shown in Table 6.

TABLE 6

Process Conditions for APR and DHOG

| | | APR I | DHOG |
|---|---|---|---|
| WHSV | $wt_{feed}/(wt_{catalyst}$ hr) | 0.7 | 0.7 |
| Added Hydrogen | $mol_{H2}/mol_{feed}$ | 6.4 | 1.1 |
| Average Reactor Temperature | ° C. | 210 | 270 |
| Pressure | psig | 1050 | 600 |

An organic phase product from the APR-DHOG continuous system was collected throughout the run, combined all together, and fed to a separate plant to perform the hydrotreating (HT) step. The HT step utilized a two-pass hydrotreating configuration as described in Example 1, which included an intermediate distillation step between each pass to remove the components heavier than the 300° C. end point for jet fuel. The HT catalyst was prepared by CRI with a nickel metal loading on an alumina support and loaded into a fixed-bed, tubular reactor. A 1:1 co-loading of amorphous silica alumina was used to distribute the catalyst.

TABLE 7

Process Conditions for HT I and II

| | | HT I | HT II |
|---|---|---|---|
| WHSV | $wt_{feed}/(wt_{catalyst}$ hr) | 3 | 1.7 |
| Added Hydrogen | $mol_{H2}/mol_{feed}$ | 13.8 | 13.6 |
| Average Reactor Temperature | ° C. | 290 | 290 |
| Pressure | psig | 800 | 800 |

The product composition of the final SK liquid organic product is shown in Table 8. The 3rd column from Table 5 in Example 1 is included to show the similarity of the product from both feedstock sources. Since the compositions of the products are very similar, it follows that the physical properties are very similar as well, as shown in Table 9.

TABLE 8

Liquid organic product composition by ASTM D2425

| Speciation | | Example 1 Corn Syrup | Example 2 Woody Biomass |
|---|---|---|---|
| Cyclo-paraffins | wt. % | 83 | 74 |
| Paraffins | wt. % | 17 | 25 |
| Aromatics | wt. % | <0.3 * | <0.3 * |
| Olefins | wt. % | <0.3 * | <0.3 * |
| PNA | wt. % | <0.3 * | <0.3 * |
| Other | wt. % | <0.3 * | <0.3 * |
| Total | wt. % | 100 | 100 |

* Actual values were beyond the indicated detection limit

TABLE 9

Physical properties of SK produced from corn syrup and biomass-derived feedstocks

| Specification Test | Test Method | Example Feedstock ASTM D1655 Jet A/A-1 Spec Requirement | Example SK 1 Corn Syrup | Example SK 2 Woody Biomass |
|---|---|---|---|---|
| Aromatics, vol. % | D1319 | ≤25 | 0.0 | 0.2 |
| Heat of Combustion (measured), MJ/kg | D4809 | ≥42.8 | 43.3 | 43.3 |
| Distillation: | D86/D7345** | | | |
| IBP, ° C. | | | 149 | 146 |
| 10% recovered, ° C. | | ≤205 | 178 | 172 |
| 50% recovered, ° C. | | | 217 | 227 |
| 90% recovered, ° C. | | | 266 | 280 |
| EP, ° C. | | ≤300 | 292 | 300 |
| Residue, % vol. | | ≤1.5 | 1.2 | 2** |
| Loss, % vol. | | ≤1.5 | 0.7 | 0 |
| Flash point, ° C. | D56 | ≥38 | 44 | 45 |
| Freezing Point, ° C. | D5972 | ≤−47 | <−78* | <−60* |
| Density @ 15° C., kg/m³ | D4052 | 775-840 | 818 | 813 |
| Thermal Stability Breakpoint, ° C. | D3241 | >260 | ≥355 | ≥325*** |
| Net Heat of combustion (MJ/kg) | D3338 | ≥42.8 | 43.3 | 43.3 |

*Actual values were beyond the indicated detection limit
**D7345 micro-distillation performed due to sample size, high residue likely an artifact of test method. No HDO-SK sample analyzed by D86 had a high residue.
***Sample not tested higher than 325° C. due to sample size, breakpoint at some temperature higher.

Example 3—Comparative Jet Fuel Blends

Several series of Example and Comparative Example jet fuel blends were prepared using Comparative Example Jet A, Example SK1 from Example 1, Comparative Example HEFA, Comparative Example GTL1, and Comparative Example GTL2. These jet fuel blends and their indicated blend ratios are summarized in Table 10.

TABLE 10

| | | Jet A content (Vol. %) | SK1 content (Vol. %) |
|---|---|---|---|
| Example Series | 3-1 | 64.5 | 35.5 |
| | 3-2 | 43.0 | 57.0 |
| | 3-3 | 32.3 | 67.7 |
| | 3-4 | 26.9 | 73.1 |
| | 3-5 | 21.5 | 78.5 |
| | 3-6 | 10.8 | 89.2 |

| | | Jet A content (Vol. %) | HEFA content (Vol. %) |
|---|---|---|---|
| Comparative Example Series | A-1 | 64.5 | 35.5 |
| | A-2 | 43.0 | 57.0 |

| | | Jet A content (Vol. %) | GTL1 content (Vol. %) |
|---|---|---|---|
| Comparative Example Series | B-1 | 64.5 | 35.5 |
| | B-2 | 43.0 | 57.0 |
| | B-3 | 32.3 | 67.7 |
| | B-4 | 16.1 | 83.9 |
| | B-5 | 10.8 | 89.2 |
| | B-6 | 5.4 | 94.6 |

TABLE 10-continued

| | | Jet A content (Vol. %) | GTL2 content (Vol. %) |
|---|---|---|---|
| Comparative Example Series | C-1 | 64.5 | 35.5 |
| | C-2 | 43.0 | 57.0 |
| | C-3 | 32.3 | 67.7 |
| | C-4 | 16.1 | 83.9 |
| | C-5 | 10.8 | 89.2 |
| | C-6 | 5.4 | 94.6 |

The Jet fuel Blends above were tested for jet fuel specification properties. The results are provided in Tables 11 below.

Aromatic contents of the blends were calculated by linear blending; that is, multiplying the percentage of Kerosene base fuel (Jet A) in the comparative example blend by the aromatic content of the Kerosene base fuel (as determined by D1319).

Gravimetric and volumetric energy densities of the two-component blends were calculated by linear blending. That is, for components $\alpha$ and $\beta$ with respective volumetric contents $[\alpha]$ and $1-[\alpha]$, respective gravimetric energy densities $\gamma_\alpha$ and $\gamma_\beta$, and respective densities of $\rho_\alpha$ and $\rho_\beta$, the gravimetric and volumetric energy densities of resulting blends can be calculated as follows:

Gravimetric energy density of blend of $\alpha$ and $\beta = [\alpha]*\gamma_\alpha + (1-[\alpha])*\gamma_\beta$ Volumetric energy density of blend of $\alpha$ and $\beta = [\alpha]*\gamma_\alpha*\rho_\alpha + (1-[\alpha])*\gamma_\beta*\rho_\beta$

TABLE 11-1

Key Specification Properties of Example Series 3

| | | SK1 content in SK1/Jet A blend (vol. %) | | | | | | |
|---|---|---|---|---|---|---|---|---|
| | | 0.0 | 35.5 | 57.0 | 67.7 | 73.1 | 78.5 | 89.2 | 100.0 |
| | | | | | Comparative Examples | | | | |
| Test | ASTM Method | Jet A | 3-1 | 3-2 | 3-3 | 3-4 | 3-5 | 3-6 | SK1 |
| | | | | | Property | | | | |
| Aromatic Content (vol. %) | D1319 or calculated | 18.6 | 12.0 | 8.0 | 6.0 | 5.0 | 4.0 | 2.0 | 0 |
| Density at 15° C. (g/cm$^3$) | D4052 | 0.7984 | 0.8037 | 0.8071 | 0.8087 | 0.8096 | 0.8104 | 0.8121 | 0.8138 |
| Freezing Point (° C.) | D5972 | −43.2 | −48.8 | NA | −58.0 | −61.1 | −64.9 | <−77.0* | <−76.0* |
| Smoke Point (mm) (automated) | D1322 | 24.3 | 26.1 | 27.9 | 28.3 | 29.3 | 29.9 | 30.2 | 31.3 |
| Hydrogen Content (mass %) | D5291 | 14.01 | 14.15 | 14.21 | 14.26 | 14.21 | 14.25 | 14.27 | 14.4 |
| Net Heat of Combustion or Gravimetric Energy Density (MJ/kg) | D3338 or calculated | 43.3 | 43.3 | 43.3 | 43.3 | 43.3 | 43.3 | 43.3 | 43.4 |
| Volumetric Energy Density (MJ/m$^3$) | Calculated | 34,600 | 34,900 | 35,000 | 35,100 | 35,100 | 35,100 | 35,200 | 35,300 |

*Actual values were beyond the indicated detection limit

TABLE 11-2

Key Specification Properties of Comparative Example Series A

| | | HEFA content in HEFA/Jet A blend (vol %) | | | |
|---|---|---|---|---|---|
| | | 0.0 | 43.0 | 64.5 | 100.0 |
| | | | Comparative Examples | | |
| Test | ASTM Method | Jet A | A-1 | A-2 | HEFA |
| | | | Property | | |
| Aromatic Content (vol. %) | D1319 or calculated | 18.6 | 12 | 8 | 0.0 |
| Density at 15° C. (g/cm$^3$) | D4052 | 0.7984 | 0.7839 | 0.7753 | 0.7570 |
| Freezing Point (° C.) | D5972 | −43.2 | −45.9 | −49.3 | −57.5 |
| Smoke Point (mm) (automated) | D1322 | 24.3 | 30.65 | 36.35 | >50.0* |
| Hydrogen Content (mass %) | D5291 | 14.01 | 14.45 | 14.73 | 15.60 |
| Net Heat of Combustion or Gravimetric Energy Density (MJ/kg) | D3338 or calculated | 43.3 | 43.6 | 43.8 | 44.1 |
| Volumetric Energy Density (MJ/m$^3$) | Calculated | 34,600 | 34,200 | 33,900 | 33,400 |

*Actual values were beyond the indicated detection limit

TABLE 11-3

Key Specification Properties of Comparative Example Series B

| | | GTL1 content in GTL1/Jet A blend (vol. %) | | | | | | |
|---|---|---|---|---|---|---|---|---|
| | | 0.0 | 35.5 | 57.0 | 67.7 | 83.9 | 89.2 | 94.6 | 100.0 |
| | | | | | Comparative Examples | | | | |
| Test | ASTM Method | Jet A | B-1 | B-2 | B-3 | B-4 | B-5 | B-6 | GTL1 |
| | | | | | Property | | | | |
| Aromatic Content (vol. %) | D1319 or calculated | 18.6 | 12.0 | 8.0 | 6.0 | 3.0 | 2.0 | 1.0 | 0.0 |
| Density at 15° C. (g/cm$^3$) | D4052 | 0.7984 | 0.7761 | 0.7636 | 0.7568 | 0.7467 | 0.7433 | 0.7396 | 0.7359 |

TABLE 11-3-continued

Key Specification Properties of Comparative Example Series B

| | | GTL1 content in GTL1/Jet A blend (vol. %) | | | | | | |
|---|---|---|---|---|---|---|---|---|
| | | 0.0 | 35.5 | 57.0 | 67.7 | 83.9 | 89.2 | 94.6 | 100.0 |
| | | | | | Comparative Examples | | | | |
| Test | ASTM Method | Jet A | B-1 | B-2 | B-3 | B-4 | B-5 | B-6 | GTL1 |
| | | | | | Property | | | | |
| Freezing Point (° C.) | D5972 | −43.2 | −49.2 | NA | −58.1 | NA | NA | −55.8 | −54.6 |
| Smoke Point (mm) (automated) | D1322 | 24.3 | 32.5 | 39.05 | 43.7 | >50.0* | >50.0* | >50.0* | >50.0* |
| Hydrogen Content (mass %) | D5291 | 14.01 | 14.55 | 14.84 | 15.06 | 15.31 | 15.40 | 15.52 | 15.60 |
| Net Heat of Combustion or Gravimetric Energy Density (MJ/kg) | D3338 or calculated | 43.3 | 43.6 | 43.8 | 43.9 | 44.1 | 44.1 | 44.2 | 44.2 |
| Volumetric Energy Density (MJ/m$^3$) | Calculated | 34,600 | 33,900 | 33,400 | 33,200 | 32,900 | 32,800 | 32,700 | 32,600 |

*Actual values were beyond the indicated detection limit

TABLE 11-4

Key Specification Properties of Comparative Example Series C

| | | GTL2 content in GTL2/Jet A blend (vol. %) | | | | | | |
|---|---|---|---|---|---|---|---|---|
| | | 0.0 | 35.5 | 57.0 | 67.7 | 83.9 | 89.2 | 94.6 | 100.0 |
| | | | | | Comparative Examples | | | | |
| Test | ASTM Method | Jet A | C-1 | C-2 | C-3 | C-4 | C-5 | C-6 | GTL2 |
| | | | | | Property | | | | |
| Aromatic Content (vol. %) | D1319 or calculated | 18.6 | 12.0 | 8.0 | 6.0 | 3.0 | 2.0 | 1.0 | 0.0 |
| Density at 15° C. (g/cm$^3$) | D4052 | 0.7984 | 0.7823 | 0.7731 | 0.7682 | 0.7609 | 0.7586 | 0.7560 | 0.7538 |
| Freezing Point (° C.) | D5972 | −43.2 | −47.2 | NA | −50.1 | NA | NA | −49.5 | −49.3 |
| Smoke Point (mm) (automated) | D1322 | 24.3 | 31.4 | 37.6 | 42.3 | 49.9 | >50.0* | >50.0* | >50.0* |
| Hydrogen Content (mass %) | D5291 | 14.01 | 14.47 | 14.78 | 14.93 | 15.18 | 15.21 | 15.32 | 15.42 |
| Net Heat of Combustion or Gravimetric Energy Density (MJ/kg) | D3338 or calculated | 43.3 | 43.6 | 43.8 | 43.9 | 44.0 | 44.0 | 44.1 | 44.1 |
| Volumetric Energy Density (MJ/m$^3$) | Calculated | 34,600 | 34,100 | 33,800 | 33,700 | 33,500 | 33,400 | 33,300 | 33,300 |

*Actual values were beyond the indicated detection limit

As can be seen from Table 11-1, SK1 can be blended to Jet A to meet Jet A-1 specification as shown in Example 3-1 and can be blended to meet AN-8 specification as shown in Example 3-3, particularly without loss, but increase in volumetric energy density.

Figure 1:
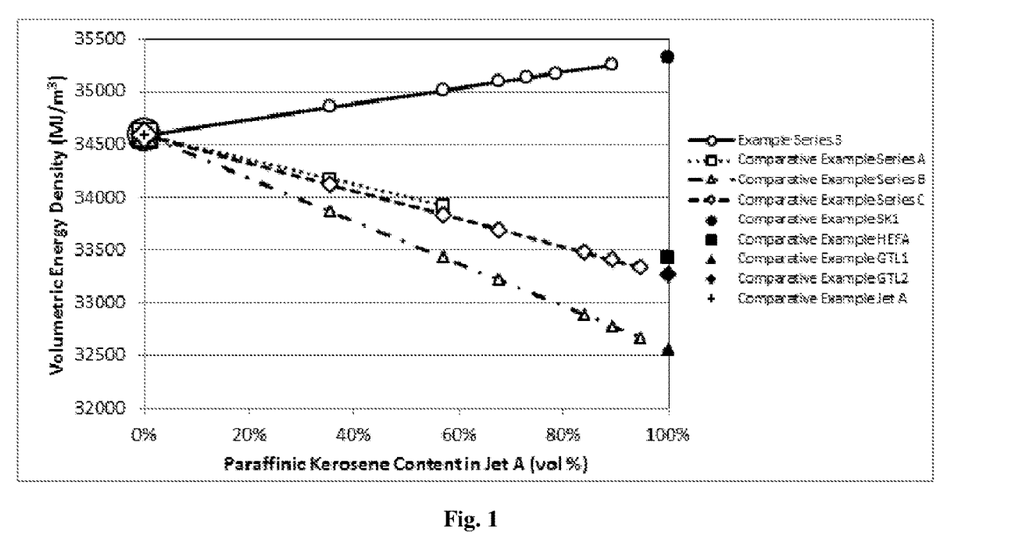
FIG. 1 shows the volumetric energy density (MJ/m$^3$) of the jet fuel blends based on paraffinic kerosene content (vol. %) in Jet A of various fuels from Examples described herein.

FIG. 1 compares the volumetric energy density (MJ/m$^3$) of the jet fuel blends Example Series 3, Comparative Example Series A, Comparative Example Series B, and Comparative Example Series C based on paraffinic kerosene content in Jet A (vol. %). Also included for completeness are the volumetric energy densities of the neat blend components Comparative Example SK1, Comparative Example HEFA, Comparative Example GTL1, Comparative Example GTL2, and Comparative Example Jet A. The data show a linear blending relationship for all blends. The slopes of all the Comparative Example Series data are negative, indicating increased paraffinic kerosene content (whether via HEFA, GTL1, or GTL2) typically results in an undesirable decrease in volumetric energy density. However, the slope of the Example 3 data is positive, indicating that increased SK1 cyclo-paraffinic kerosene content resulted in increased volumetric energy density. This demonstrates the unique ability to blend a cyclo-paraffinic kerosene product such as SK1 into a kerosene base fuel without decreasing, but rather increase volumetric energy density. This is desirable because higher volumetric energy density results in aircraft flying greater distances using the same volume of fuel, or in other words, with greater payload range.

Figure 2:
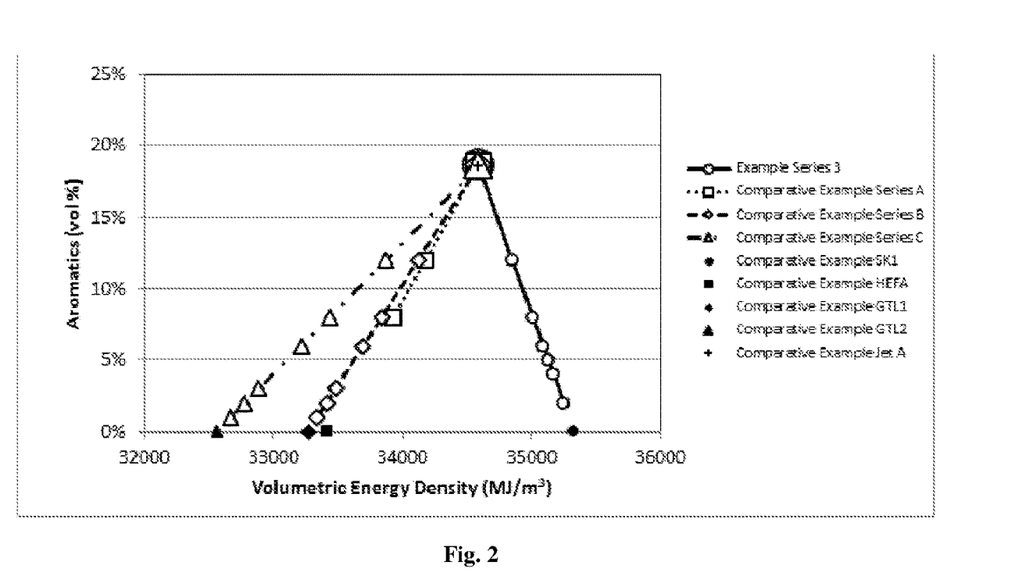
FIG. 2 shows a plot of the aromatics content (vol. %) versus volumetric energy density (MJ/m$^3$) of the various jet fuel blends from Examples described herein.

FIG. 2 compares the aromatics content (vol. %) versus volumetric energy density (MJ/m$^3$) of the jet fuel blends Example Series 3, Comparative Example Series A, Comparative Example Series B, and Comparative Example Series C. Also included for completeness are the aromatics contents of the neat blend components Comparative Example SK1, Comparative Example HEFA, Comparative Example GTL1, Comparative Example GTL2, and Comparative Example Jet A. The data show a linear blending relationship for all blends. The slopes of all the Comparative Example Series data are positive, indicating that increased volumetric energy density typically requires an undesirable increase in aromatics content. However, the slope of the Example Series 3 data is negative, indicating increased volumetric energy density with decreasing aromatics content. This demonstrates the unique ability to blend a cyclo-paraffinic kerosene product such as SK1 into a kerosene base fuel to decrease aromatics content without decreasing, but rather increase volumetric energy density. This is desirable because lower aromatics content improves engine operability and lifetime and reduces soot emissions; and higher volumetric energy density results in aircraft flying greater distances using the same volume of fuel, or in other words, with greater payload range.

Figure 3:
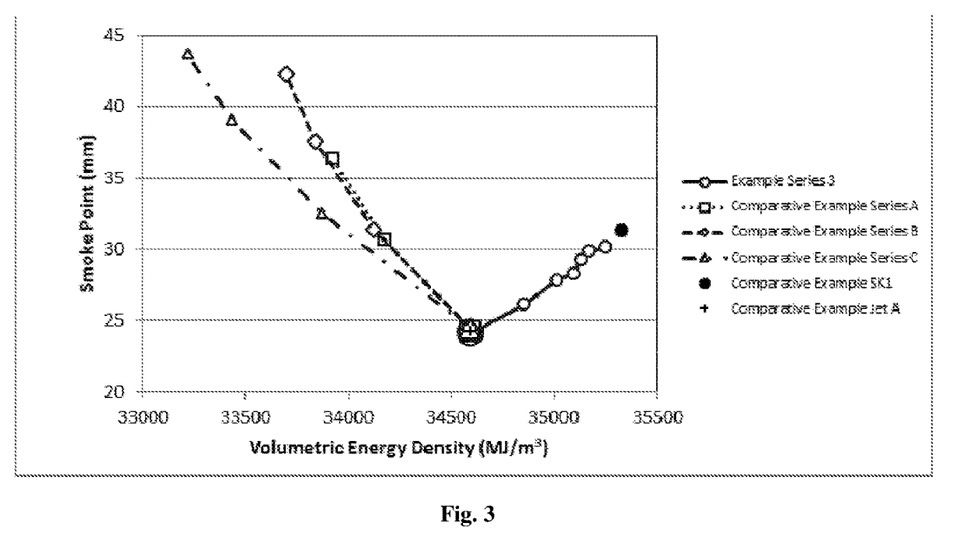
FIG. 3 shows the smoke point increase of jet fuel with volumetric energy density (MJ/m$^3$) of the various jet fuel blends from Examples described herein.

FIG. 3 compares the smoke point increase (mm) of jet fuel with volumetric energy density (MJ/m$^3$) of the jet fuel blends Example 3, Comparative Example Series A, Comparative Example Series B, and Comparative Example Series C. Also included for completeness are the smoke points of the neat blend components Comparative Example SK1, Comparative Example HEFA, Comparative Example GTL1, Comparative Example GTL2, and Comparative Example Jet A. The data show a non-linear blending relationship for all blends. The slopes of all the Comparative Example Series data are negative, indicating increased volumetric energy density typically requires an undesirable decrease in smoke point. However, the slope of the Example 3 data is positive, indicating increased volumetric energy density with increasing smoke point. This demonstrates the unique ability to blend a cyclo-paraffinic kerosene product such as SK1 into a kerosene base fuel to increase volumetric energy density without decreasing, but rather increase smoke point. This is desirable because higher smoke point indicates a cleaner-burning fuel; and higher volumetric energy density results in aircraft flying greater distances using the same volume of fuel, or in other words, with greater payload range.

Figure 4:
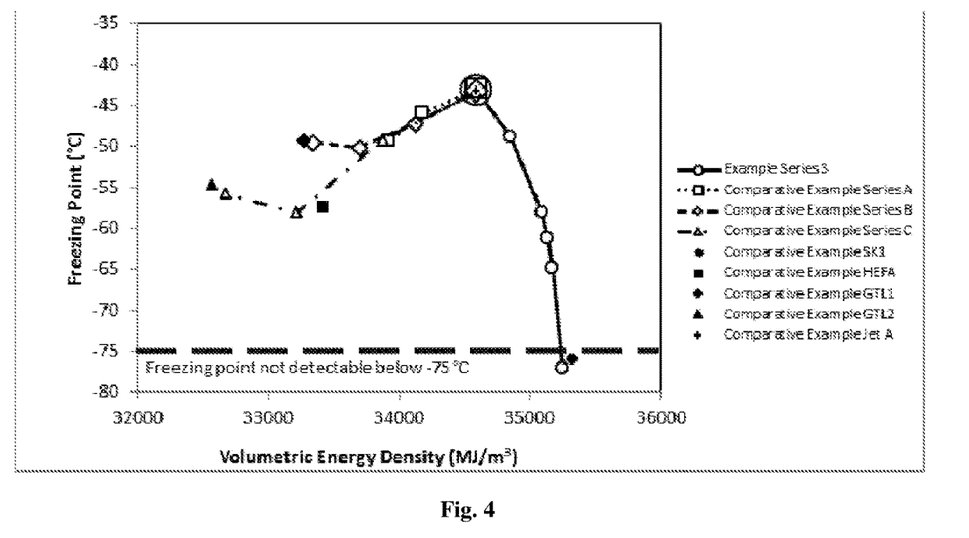
FIG. 4 shows the freezing point (° C.) of various jet fuel blends from Examples described herein versus volumetric energy density (MJ/m$^3$).

FIG. 4 compares the freezing point increase (° C.) of jet fuel with volumetric energy density (MJ/m$^3$) of the jet fuel blends Example Series 3, Comparative Example Series A, Comparative Example Series B, and Comparative Example Series C. Also included for completeness are the freezing points of the neat blend components Comparative Example SK1, Comparative Example HEFA, Comparative Example GTL1, Comparative Example GTL2, and Comparative Example Jet A. The data show a non-linear blending relationship for all blends. The Comparative Example Series data indicate increased volumetric energy density typically requires an undesirable increase in freezing point. However, the Example 3 data show increased volumetric energy density with decreasing freezing point. This demonstrates the unique ability to blend a cyclo-paraffinic kerosene product such as SK1 into a kerosene base fuel to increase volumetric energy density without increasing, but rather decrease the freezing point. This is desirable because a lower freezing point enables a fuel to meet more stringent specifications (such as for AN-8) or to fly more direct routes through colder areas, and have wider applicability for cold environments; and higher volumetric energy density results in aircraft flying greater distances using the same volume of fuel, or in other words, with greater payload range.

We claim:

1. A method for upgrading a kerosene fuel to meet Jet A-1 specification or JP-8 specification;
   a. providing a quantity of kerosene base fuel having a boiling point in the range of 130° C. to 300° C., at atmospheric pressure, flash point of 38° C. or above measured by ASTM D56, a density at 15° C. of at least 775 kg/m$^3$ and freezing point of above −47° C.;
   b. providing a quantity of synthetic cyclo-paraffinic kerosene fuel blending component comprising at least 99.5 mass % of carbon and hydrogen content and at least 70 mass % of cyclo-paraffin, a maximum iso- and n-paraffin content of less than 30 mass % (ASTM D2425) and an aromatic content of at most 1.5 mass % (ASTM D2425), said cyclo-paraffinic kerosene fuel blending component having a boiling point of at most 300° C., at atmospheric pressure, flash point of 38° C., or above, a density at 15° C. of at least 800 kg/m$^3$, and freezing point of −60° C. or below, wherein the synthetic cyclo-paraffinic kerosene fuel blending component is derived from biomass; and
   c. blending a quantity of the synthetic cyclo-paraffinic kerosene fuel blending component and the kerosene base fuel in amount sufficient to lower the freezing point of the blended fuel to −47° C. or lower, wherein the amount of the synthetic cyclo-paraffinic kerosene fuel blending component is at least 1 vol. %, based on the blended fuel.

2. The method of claim 1 wherein the blended fuel has a density of equal or above 800 mg/m$^2$.

3. The method of claim 1 wherein the aromatic content of the blended fuel is less than or equal to 25 vol %.

4. The method of claim 1 wherein the amount of the synthetic cyclo-paraffinic kerosene fuel blending component is at least 3 vol. %, based on the blended fuel.

5. The method of claim 1 wherein the synthetic cyclo-paraffinic kerosene fuel blending component have a freezing point of −65° C. or below.

6. The method of claim 1 further comprising d) blending an additional propulsion fuel blending component to the blended fuel.

7. The method of claim 1 wherein the kerosene base fuel is a kerosene meeting Jet A or F-24 specification.

8. A method of operating a jet engine comprising burning in said jet engine a jet fuel of prepared by the method of claim 1.

9. A method for upgrading a kerosene fuel to meet AN-8 specification;
   a. providing a quantity of kerosene base fuel having a boiling point in the range of 130° C. to 300° C., at atmospheric pressure, flash point of 38 or above measured by ASTM D56, and a density at 15° C. of at least 775 kg/m$^3$ and freezing point of above −58° C.;
   b. providing a quantity of synthetic cyclo-paraffinic kerosene fuel blending component comprising at least 99.5 mass % of carbon and hydrogen content and at least 70 mass % of cyclo-paraffin, a maximum iso- and n-paraffin content of less than 30 mass % (ASTM D2425) and an aromatic content of at most 1.5 mass % (ASTM D2425), said cyclo-paraffinic kerosene fuel blending component having a boiling point of at most 300° C., at atmospheric pressure, flash point of 38° C., or above, a density at 15° C. of at least 800 kg/m$^3$, and freezing point of −60° C. or below, wherein the synthetic cyclo-paraffinic kerosene fuel blending component is derived from biomass; and c. blending a quantity of the synthetic cyclo-paraffinic kerosene fuel blending component and the kerosene base fuel in amount sufficient to lower the freezing point of the blended fuel to −58° C. or lower, wherein the amount of the synthetic cyclo-paraffinic kerosene fuel blending component is at least 1 vol. %, based on the blended fuel.

10. The method of claim 9 wherein the blended fuel has a density of equal or above 800 mg/m$^2$.

11. The method of claim 9 wherein the aromatic content of the blended fuel is less than or equal to 25 vol %.

12. The method of claim 9 wherein the amount of the synthetic cyclo-paraffinic kerosene fuel blending component is at least 3 vol. %, based on the blended fuel.

13. The method of claim 9 wherein the synthetic cyclo-paraffinic kerosene fuel blending component have a freezing point of −65° C. or below.

14. The method of claim 9 wherein the kerosene base fuel is a kerosene meeting at least one of Jet A, F-24, Jet-A1, or F-24 specification.

15. The method of claim 9 further comprising d) blending an additional propulsion fuel blending component to the blended fuel.

16. A method of operating a jet engine comprising burning in said jet engine a jet fuel of prepared by the method of claim 9.

17. A method of operating an engine or turbine in cold temperature comprising providing the blended fuel prepared by the method of claim 9 to the engine or turbine and operating said engine or turbine.

18. A method for upgrading a kerosene fuel to meet Jet A or F-24 specification;

a. providing a quantity of kerosene base fuel having a boiling point in the range of 130° C. to 300° C., at atmospheric pressure, flash point of 38° C. or above measured by ASTM D56, a density at 15° C. of at least 760 kg/m$^3$ and freezing point of above −40° C.;

b. providing a quantity of synthetic cyclo-paraffinic kerosene fuel blending component comprising at least 99.5 mass % of carbon and hydrogen content and at least 70 mass % of cyclo-paraffin, a maximum iso- and n-paraffin content of less than 30 mass % (ASTM D2425) and an aromatic content of at most 1.5 mass % (ASTM D2425), said cyclo-paraffinic kerosene fuel blending component having a boiling point of at most 300° C., at atmospheric pressure, flash point of 38° C., or above, a density at 15° C. of at least 800 kg/m$^3$, and freezing point of −60° C. or below, wherein the synthetic cyclo-paraffinic kerosene fuel blending component is derived from biomass; and c. blending a quantity of the synthetic cyclo-paraffinic kerosene fuel blending component and the kerosene base fuel in amount sufficient to lower the freezing point of the blended fuel to −40° C. or lower, wherein the amount of the synthetic cyclo-paraffinic kerosene fuel blending component is at least 1 vol. %, based on the blended fuel.

19. The method of claim 18 wherein the blended fuel has a density of equal or above 800 mg/m$^2$.

20. The method of claim 18 wherein the aromatic content of the blended fuel is less than or equal to 25 vol %.

21. The method of claim 18 wherein the amount of the synthetic cyclo-paraffinic kerosene fuel blending component is at least 3 vol. %, based on the blended fuel.

22. The method of claim 18 wherein the synthetic cyclo-paraffinic kerosene fuel blending component have a freezing point of −65° C. or below.

23. The method of claim 18 further comprising d) blending an additional propulsion fuel blending component to the blended fuel.

* * * * *

UNITED STATES PATENT AND TRADEMARK OFFICE
CERTIFICATE OF CORRECTION

PATENT NO. : 11,021,666 B2
APPLICATION NO. : 15/386023
DATED : June 1, 2021
INVENTOR(S) : Cynthia Natalie Ginestra et al.

It is certified that error appears in the above-identified patent and that said Letters Patent is hereby corrected as shown below:

In the Specification

In Column 3, Lines 53-57, delete "c. blending a quantity of the synthetic cyclo-paraffinic kerosene fuel blending component to the kerosene base fuel in amount effective to increase the volumetric energy content, preferably at least 0.1% increase in the volumetric energy content." and insert the same on, in Column 3, Line 54 as a new paragraph.

In Column 8, Line 35, delete "bluestream," and insert -- bluestem, --, therefor.

In the Claims

In Column 30, Line 49, in Claim 8, after "fuel" delete "of".

In Column 31, Line 28, in Claim 16, after "fuel" delete "of".

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*